United States Patent [19]

Kruck et al.

[11] Patent Number: 5,374,118

[45] Date of Patent: Dec. 20, 1994

[54] DOMESTIC APPLIANCE PANELS AND METHOD OF FORMING SAME

[75] Inventors: Richard W. Kruck, Sodus Township, Berrien County, Mich.; Ronald F. Iannelli, Burnsville, Minn.; Kevin S. Laundroche, Commerce Township, Oakland County, Mich.; Ralph R. Burin, Milton Township, DuPage County, Ill.

[73] Assignee: Whirlpool Corporation, Benton Harbor, Mich.

[21] Appl. No.: 947,258

[22] Filed: Sep. 18, 1992

Related U.S. Application Data

[60] Division of Ser. No. 279,567, Dec. 2, 1988, Pat. No. 5,168,621, which is a continuation-in-part of Ser. No. 218,232, Jul. 12, 1988, abandoned.

[51] Int. Cl.$^5$ .............................................. F25D 11/00
[52] U.S. Cl. ..................................... 312/407; 312/406; 220/421; 220/339; 220/467
[58] Field of Search ..................... 312/258, 262, 406.2, 312/406, 407, 401, 400; 220/339, 420, 421, 467

[56] References Cited

U.S. PATENT DOCUMENTS 4,006,947  2/1977  Haag ..................................... 312/406
4,703,853  11/1987  Byrns ..................................... 220/469

FOREIGN PATENT DOCUMENTS 1140212  11/1962  Germany ........................... 312/258

Primary Examiner—Kenneth J. Dorner
Assistant Examiner—Gerald A. Anderson
Attorney, Agent, or Firm—Mason, Kolehmainen, Rathburn & Wyss

[57] ABSTRACT

An insulated panel for a domestic or household appliance is formed by a process in which two sheets of plastic material are extruded from a co-extrusion die and moved directly into a die thermoforming fixture. When the open die members are closed, the edges of the two sheets are sealed together to form a hollow panel and the walls of the panel are forced outwardly to conform to the shape of the die members. After the hollow panel is trimmed it is moved to a foam machine preferably while still contained in the thermoforming fixture so that foam insulation is inserted into the hollow panel while the walls of the panel are supported by the die members so that these walls are not deformed while the foam insulation is added. The process provides integrally formed components on the walls of the panel in a single manufacturing operation and also provides in the same manufacturing operation integrally formed interlocking means in the edges of the panel which permits the assembly of panels together by unskilled personnel and without requiring separate fastening means.

2 Claims, 26 Drawing Sheets

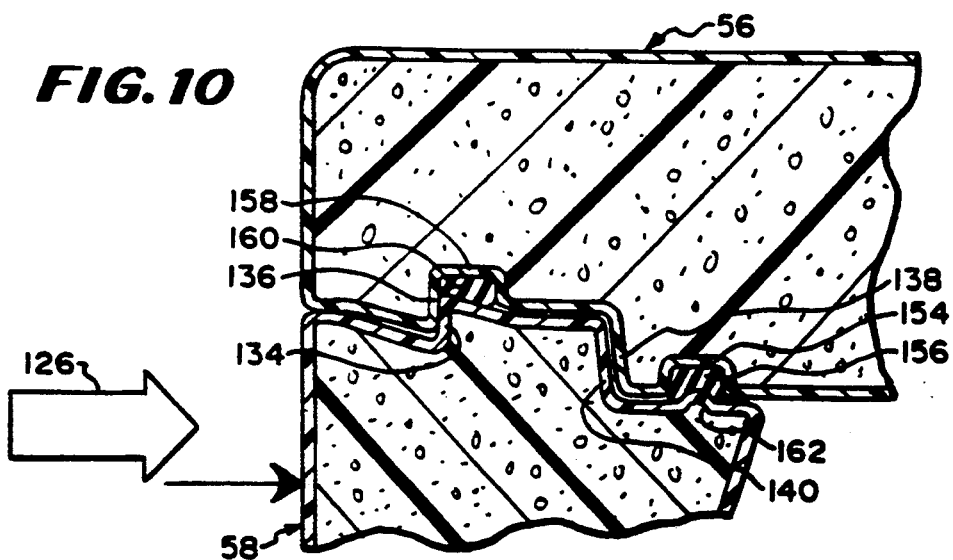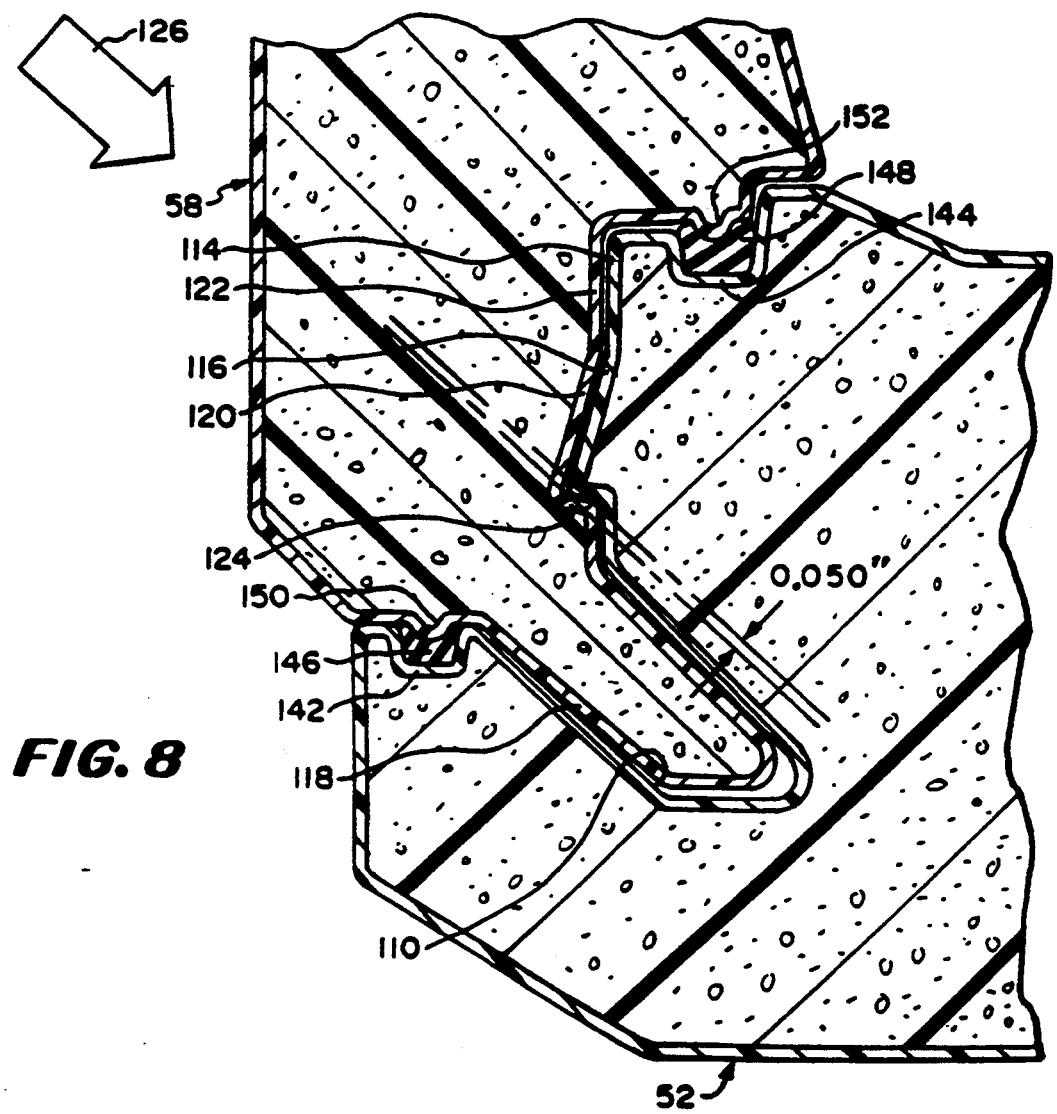

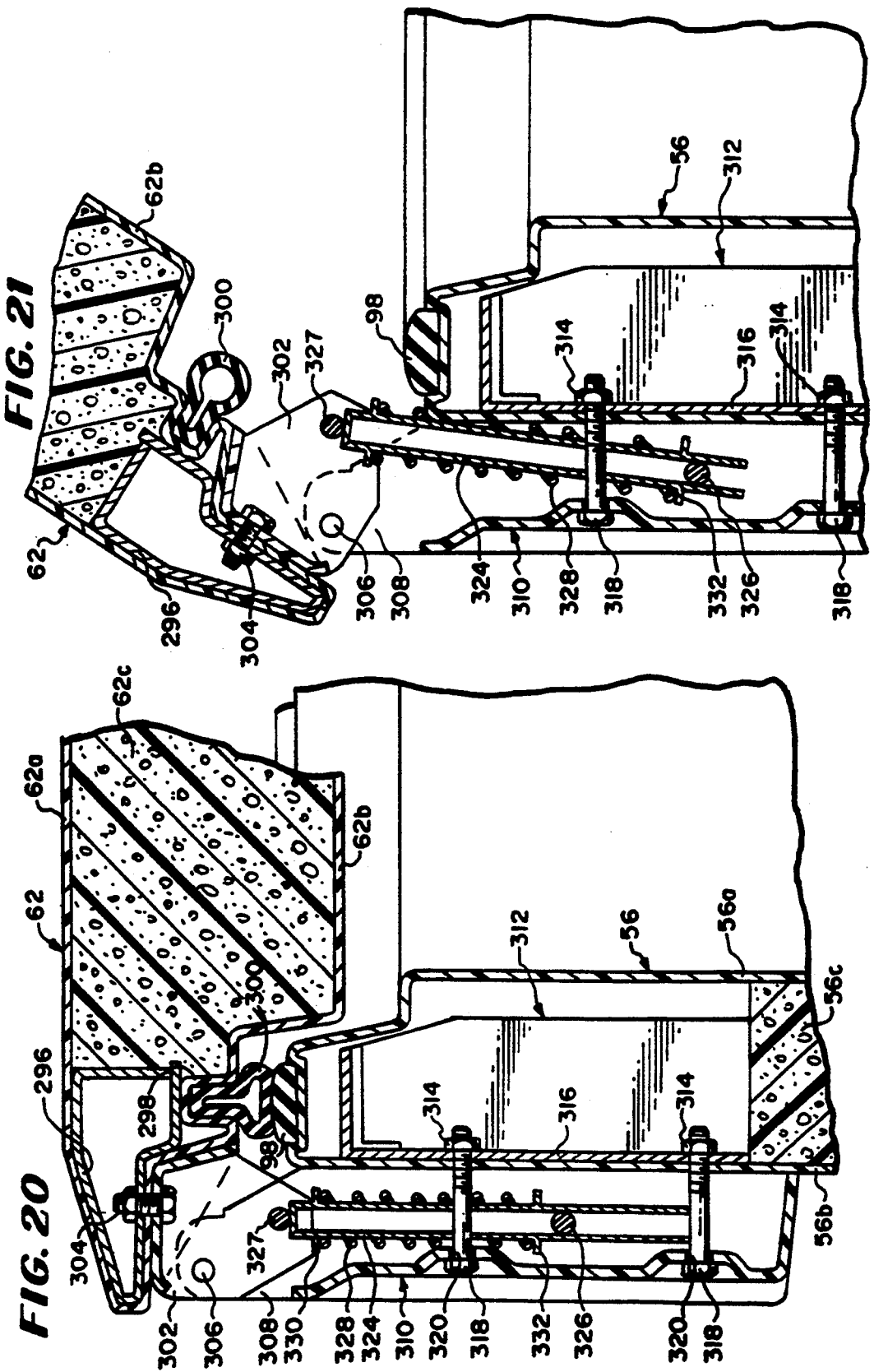

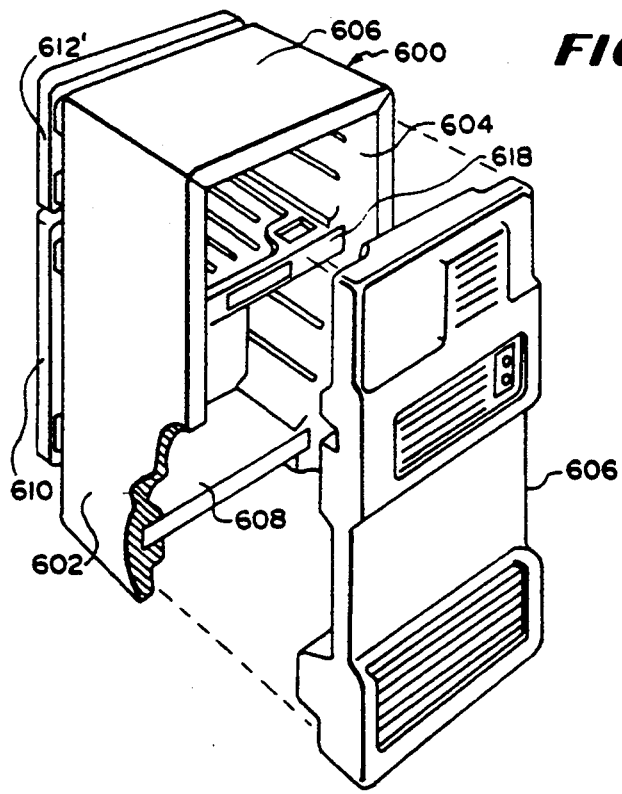
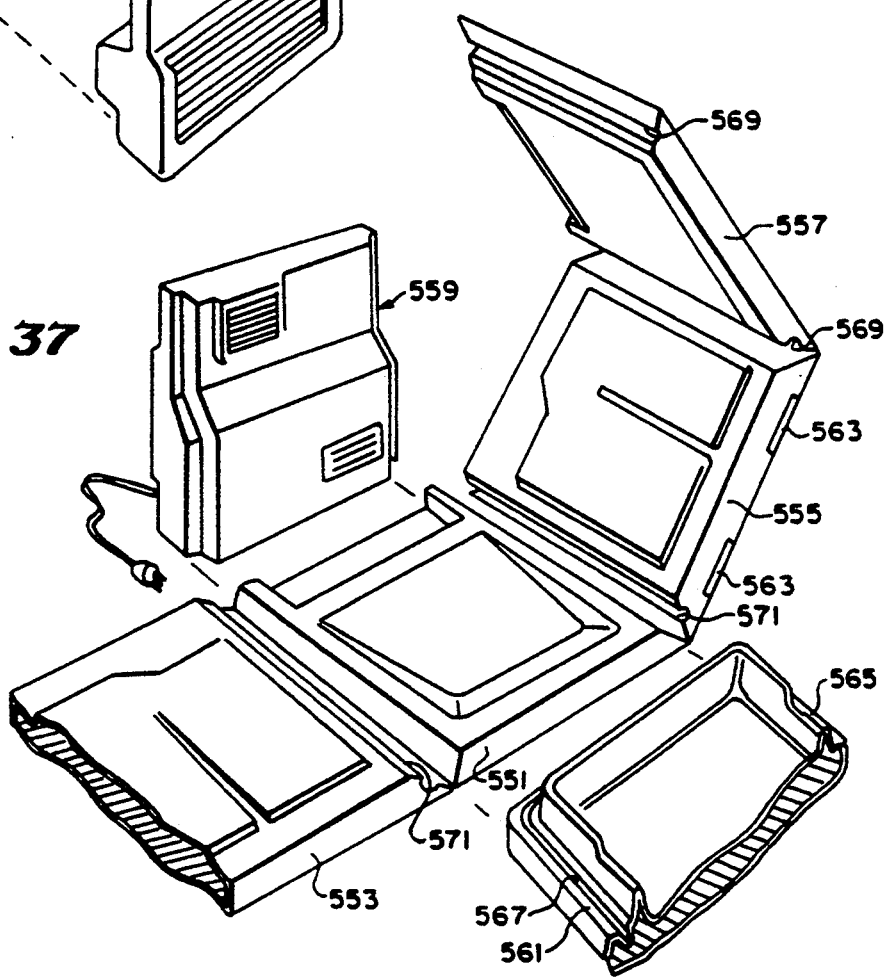

DOMESTIC APPLIANCE PANELS AND METHOD OF FORMING SAME

CROSS REFERENCE TO RELATED APPLICATION

This application is a divisional application of U.S. patent application Ser. No. 07/279,567, filed Dec. 2, 1988, now U.S. Pat. No. 5,168,621 which application is a continuation-in-part application of U.S. patent application Ser. No. 07/218,232, filed Jul. 12, 1988 now abandoned, entitled "DOMESTIC APPLIANCE PANELS AND METHOD OF FORMING SAME", which prior application is incorporated herein by reference.

This application is a continuation-in-part application of U.S. patent application Ser. No. 07/218,232, filed Jul. 12, 1988 now abandoned, entitled "DOMESTIC APPLIANCE PANELS AND METHOD OF FORMING SAME", and is incorporated herein by reference. The above application is assigned to the same assignee as the assignee of the present application.

BACKGROUND OF THE INVENTION

A. Field of the Invention

The present invention relates generally to domestic appliances, and, more particularly, to a method of forming panels which are readily assembled into domestic appliances and to panels formed by said method. While the invention is particularly suitable for and will be described in detail in connection with a demountable or knockdown chest freezer type of domestic appliance, the invention is useful in a wide variety of domestic appliances, some of which are described generally hereinafter.

B. Description of the Prior Art

Various arrangements have been heretofore proposed in the domestic appliance field to simplify the manufacture thereof and minimize the number of manufacturing operations required. For example, in the refrigeration art an attempt has been made to simplify the manufacturing process by forming a flat laminate of sheet liner and insulation, slitting the insulation along lines corresponding to the corners of the outer cabinet, folding the sheet liner at the slits and then inserting the folded laminate within the outer cabinet. Examples of such a method of manufacture are shown in U.S. Pat. Nos. 3,910,658; 3,999,820; 4,006,947; 4,033,806; 4,043,624 and 4,050,145. It has also been proposed in U.S. Pat. No. 3,834,177 to mold the entire inner liner in a complex molding apparatus.

Attempts have also been made to simplify the construction of domestic appliances by providing a wrap around type of outer cabinet, as shown for example in U.S. Pat. Nos. 4,348,068; 4,580,852; 4,082,825 and 4,632,420. While the above-enumerated arrangements have been generally suitable for their intended purpose they leave much to be desired in the simplification of the entire manufacturing process for a domestic appliance.

Various arrangements have also been heretofore proposed to provide a demountable or knockdown type of domestic appliance in which individual wall panels are shipped disassembled to a desired location and then assembled into a desired finished product, as shown, for example, in U.S. Pat. Nos. 2,127,111; 2,502,581; 2,507,379; 2,509,779; 2,521,064; 2,535,682; 3,392,497; 3,995,922 and 4,358,213. However, the panels employed in these arrangements require a complex series of manufacturing operations. Furthermore, these arrangements are complicated in construction and require the use of tools and/or separate fastening means which renders them more difficult to assemble, particularly when assembly by inexperienced field personnel or the ultimate customer is contemplated.

In addition to the above, a number of other arrangements have employed various types of interlocking joints for demountable furniture, and the like. However, these arrangements are not simple to manufacture on a mass production basis. Also, these arrangements are again quite complicated, usually require a multiplicity of small parts and separate fastening means, and are not particularly suitable for use in the domestic appliance field when assembly by the ultimate customer is contemplated. Examples of such demountable constructions are shown in U.S. Pat. Nos. 305,286; 409,893; 419,920; 582,005; 1,534,468; 2,496,184; 3,565,503; 3,674,328; 3,722,157; 4,019,298; 4,127,353 and 4,408,812.

SUMMARY OF THE INVENTION

An object of the invention is to provide a new and improved method of manufacturing a domestic appliance panel which comprises the steps of (1) extruding two sheets of plastic material into the space between two opposed open die members; (2) closing said die members to seal the edges of said two sheets together; and (3) causing said sheets to conform to the shape of said die members, thereby providing a hollow panel having opposed walls formed to the configuration of said die members.

Another object of the present invention is to provide a new and improved method of manufacturing a plurality of interconnected domestic appliance panels which comprises the steps of (1) extruding two sheets of plastic material into the space between two opposed die members; (2) closing said die members to (a) seal the outer edges of said two sheets together, and (b) seal intermediate portions of said two sheets together along a predetermined hinge line; and (3) causing said sheets to conform to the shape of said die members, thereby providing two hollow panels each having opposed walls formed to the shape of said die members and interconnected by a sealed hinge portion along said predetermined hinge line.

Another object of the present invention is to provide a new and improved domestic appliance which includes at least one panel which comprises spaced apart inner and outer die-formed walls of plastic material which are sealed together at the edges thereof, and insulating material at least partially filling the space between said inner and outer walls.

Another object of the present invention is to provide a domestic appliance which includes a plurality of panels, each of said panels comprising spaced apart inner and outer die-formed walls of plastic material which are sealed together at the edges thereof, and insulating material at least partially filling the space between said inner and outer walls of each of said panels.

Another object of the present invention is to provide a new and improved domestic appliance which includes a plurality of panels, the inner walls of which are formed by a first sheet of plastic material and the outer walls of which are formed by a second sheet of plastic material, the first and second sheets being sealed together to provide integral hinge portions interconnecting the plurality of panels.

Briefly, the present invention employs a type of twin sheet thermoforming process to provide in a single manufacturing operation domestic appliance panels which have integrally formed therein components which are normally manufactured as separate items. More particularly, two sheets of plastic material are extruded from a co-extrusion die and moved directly into a die thermoforming fixture. When the open die members are closed, the edges of the two sheets are sealed together to form a hollow panel and the walls of the panel are forced outwardly to conform to the shape of the die members. After the hollow panel is trimmed, it may be moved to a foam machine while still contained in the thermoforming fixture so that foam insulation may be introduced into the hollow panel while the walls of the panel are supported by the die members so that these walls are not deformed while the foam insulation is added or the hollow panel may be moved to a foam fixture to receive foam insulation between the spaced panel walls.

The twin sheet thermoforming process has been conventionally used in the past to form hollow panels for use in fields other than the domestic or household appliance field. However, applicants believe they are the first to use the above-described process in domestic and home appliances, particularly those appliances where the thermal conductivity through the panel is important, as in the chest freezer described in detail hereinafter.

The twin sheet thermoforming process described above not only provides integrally formed components in a single manufacturing operation but is also employed in accordance with the present invention to provide in the same manufacturing operation integrally formed interlocking means in the edges of the panels which permit the panels to be readily assembled together by unskilled personnel, without requiring separate fastening means.

In accordance with a further feature of the invention the two sheets of plastic material may be of different colors so that the domestic appliance panel may have a desired color on the outer wall and a different color on the inner wall. Furthermore, the two sheets of plastic material may have different compositions in situations where plastic material having one set of characteristics is desired for the outer wall of the panel and a plastic material having a different set of characteristics is desired for the inner wall of the panel.

In accordance with a further feature of the invention, one or more inserts can be positioned between the opposed sheets of plastic material while the die members are open so that these inserts are incorporated into the panel in the same manufacturing operation. These inserts, which may be of metal or other rigid material, may be employed to strengthen the finished panel or may be positioned so that they form functional components of the panel, such as hinge supports, or the like. Furthermore, since these inserts are positioned as the hollow panel is formed, they do not interfere with the step of inserting foam insulation into the hollow panel while it is contained within the die thermoforming fixture.

In accordance with a further feature of the invention, the above-described twin sheet thermoforming process may be employed to provide a plurality of interconnected domestic appliance panels in a single manufacturing operation. More particularly, the thermoforming die fixture is arranged to seal not only the outer edges of the two sheets of plastic material but also seals intermediate portions of these sheets along predetermined hinge lines so that several hollow panels are formed simultaneously which are interconnected by flexible hinge portions along the sealed hinge lines. The thermoforming die fixture is also shaped to provide end wall portions of two adjacent panels which are contiguous when these panels are positioned at right angles by folding along the hinge lines. A series of four interconnected panels may thus be formed in a single manufacturing operation; and, when folded along predetermined hinge lines, the series of panels provides the top, side walls and base of a domestic appliance. Also, the meeting or mating edges of the outer two panels may be formed with integral interlocking means during the same manufacturing operation so that these edges may be secured together after the panels have been folded.

BRIEF DESCRIPTION OF THE DRAWING

The above and other objects, advantages and novel features of the present invention will become apparent from the following detailed description of a preferred embodiment of the invention illustrated in the accompanying drawing, wherein:

FIG. 3A is a circuit diagram of a lid closure detecting arrangement employed in the freezer of FIG. 1;

FIG. 3B is a circuit diagram of an alternative lid closure detecting arrangement which employs a vacuum controlled switch;

FIG. 8 is a sectional view taken along the line 8—8 of FIG. 1 and shown on an enlarged scale;

FIG. 10 is a sectional view taken along the line 10—10 of FIG. 1;

FIG. 20 is a sectional view taken on an enlarged scale along the line 20—20 of FIG. 2 and showing the lid hinge arrangement of the freezer of FIG. 1;

FIG. 21 is a sectional view similar to FIG. 20 but shows the lid in a raised position;

FIG. 36 is a rear perspective view of the refrigerator/freezer of FIG. 35 shown with the rear panel removed and a portion of one side wall broken away;

FIG. 37 is an exploded perspective view of an alternative countertop refrigerator unit which incorporates a plurality of interconnected panels formed by the process of the present invention;

DESCRIPTION OF THE PREFERRED EMBODIMENT

GENERAL DESCRIPTION

Figure 1:
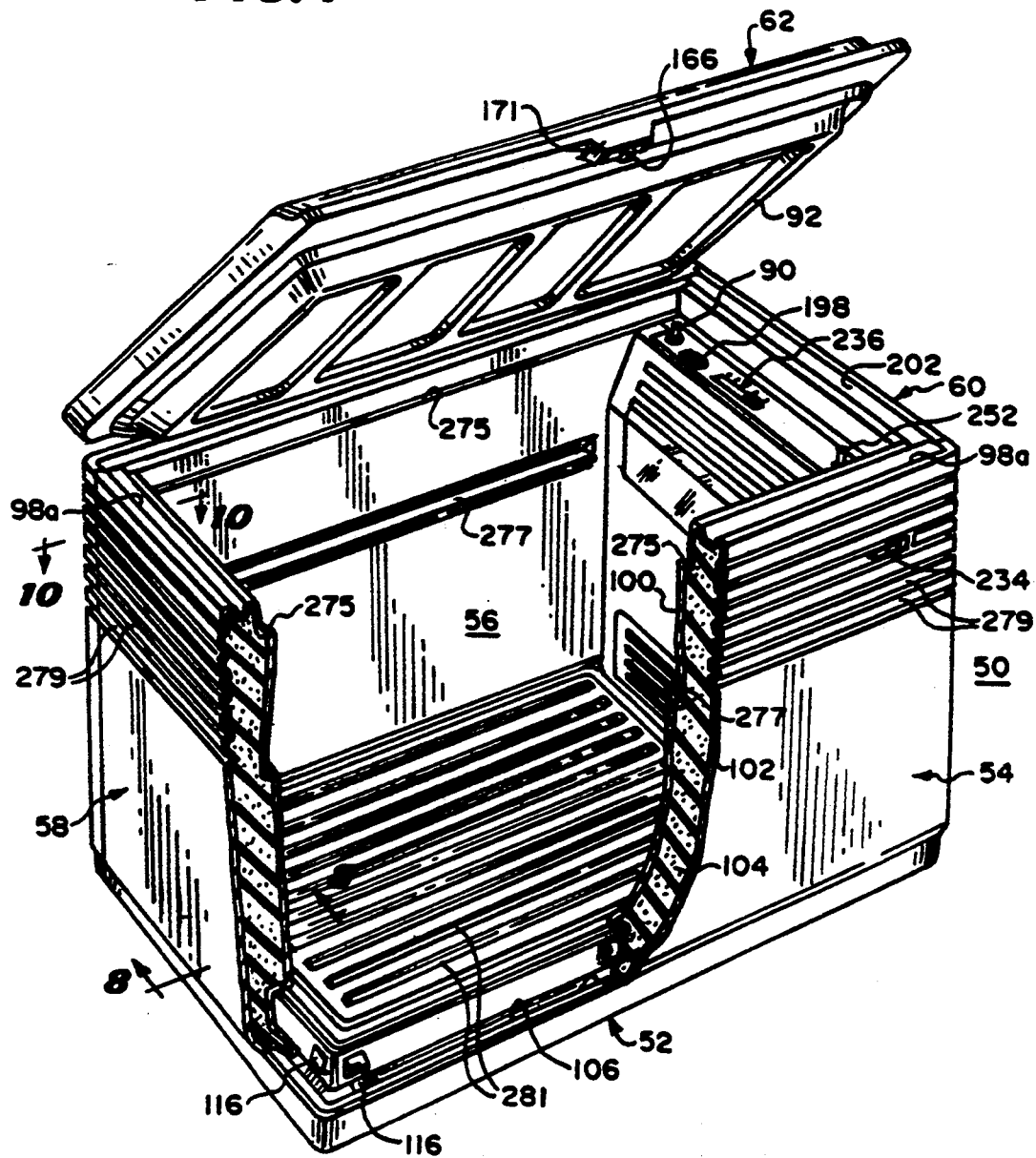
FIG. 1 is a frontal perspective view of a knockdown chest freezer embodying features of the present invention and shown with portions of the front and left-hand side panels broken away.
Figure 2:
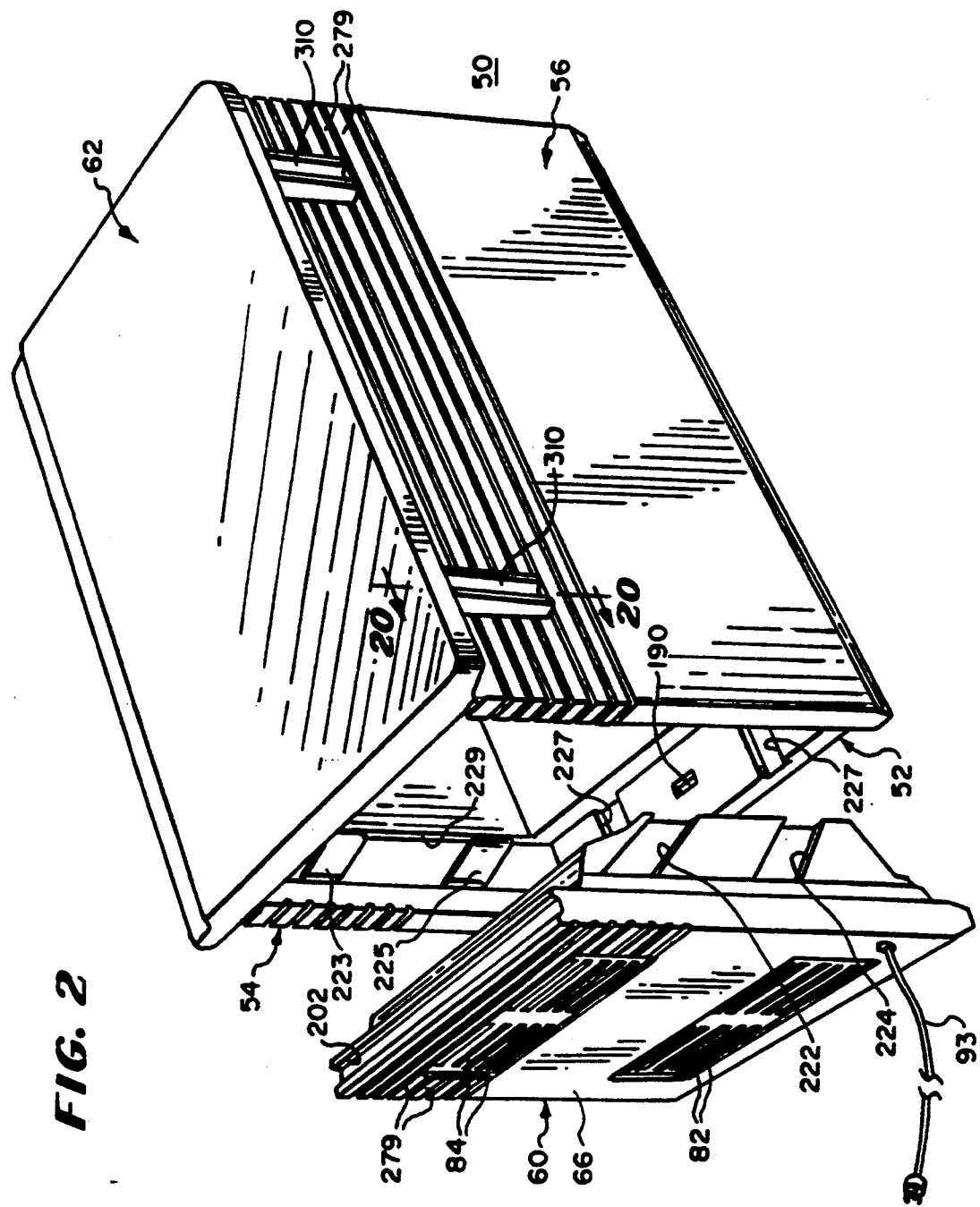
FIG. 2 is a rear perspective view of the chest freezer of FIG. 1 shown with the lid closed and with the right-hand side panel, which contains a complete mechanical refrigeration unit, disassociated from the remainder of the freezer.
Figure 3:
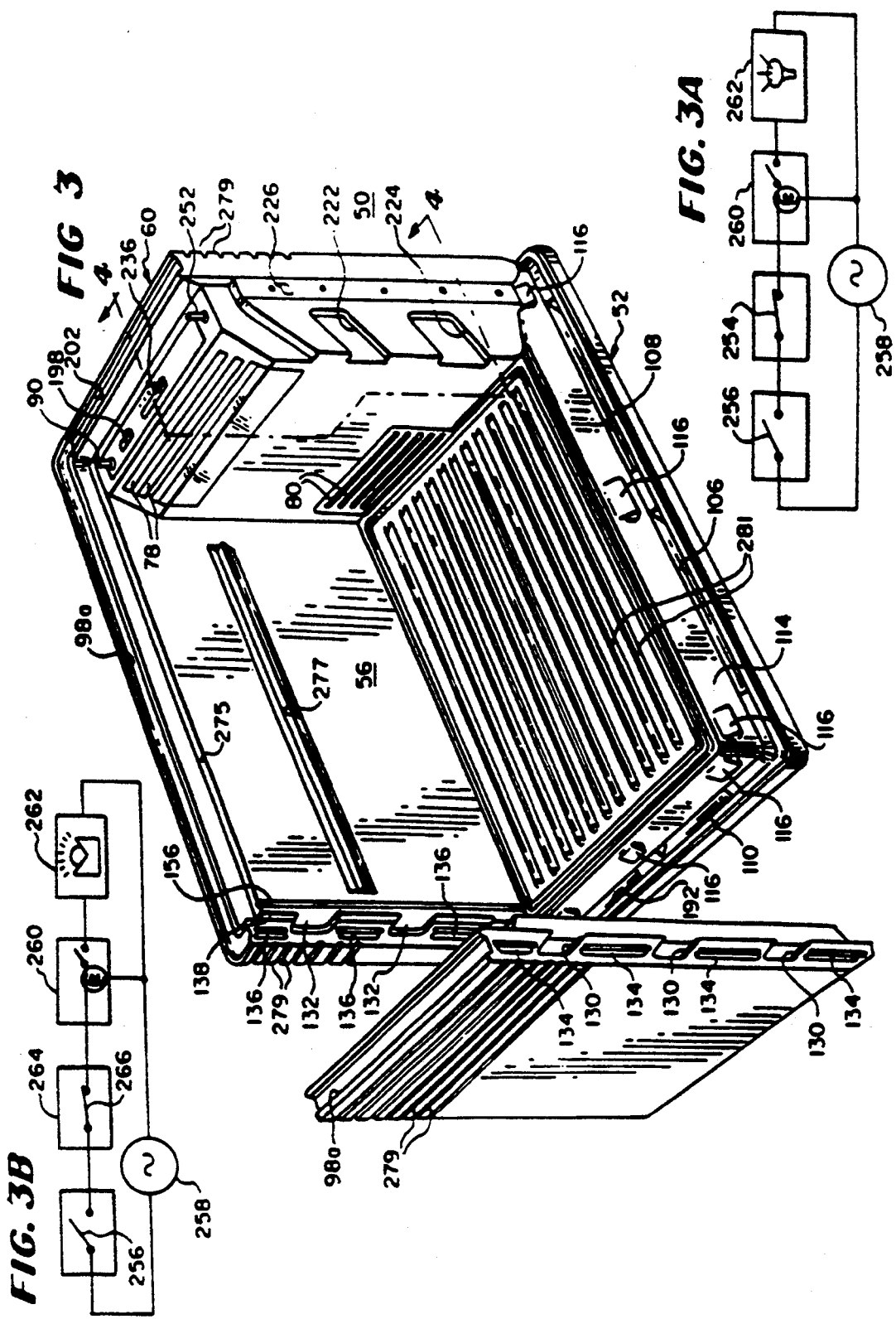
FIG. 3 is a frontal perspective view of the freezer, similar to FIG. 1 but shown without the front panel and lid, and with the left-hand side panel removed from the base and rear panels.

Referring now to the drawing and initially to FIGS. 1, 2 and 3 thereof, the features of the present invention are disclosed in a chest freezer indicated generally at 50. In accordance with an important aspect of the disclosed arrangement, the freezer 50 is of demountable or knockdown construction so that the individual modules or panels thereof may be shipped disassembled to a desired location and then assembled into a finished freezer by unskilled personnel, including the ultimate customer, without the use of special tools or separate retaining means. More particularly, the freezer 50 includes a base panel indicated generally at 52, a front panel indicated generally at 54, a rear panel indicated generally at 56, a left-hand end panel indicated generally at 58 and a right-hand end panel indicated generally at 60. The base panel 52 and the side panels 54-60 are provided with integral interlocking surfaces in the edges thereof, which will be described in more detail hereinafter, so that the side panels 54-60 may be readily assembled on the base panel 52 by simple engagement of these interlocking surfaces in the panel edges. More particularly, the front and rear panels 54 and 56 are first mounted on the base panel 52 and the side panels 58 and 60 are then interfitted with the ends of the front and rear panels 54, 56 and the base panel 52. A lid or closure member indicated generally at 62 may then be secured to the rear panel 56, as described in detail hereinafter, to provide a completely enclosed refrigerated compartment.

Figure 6:
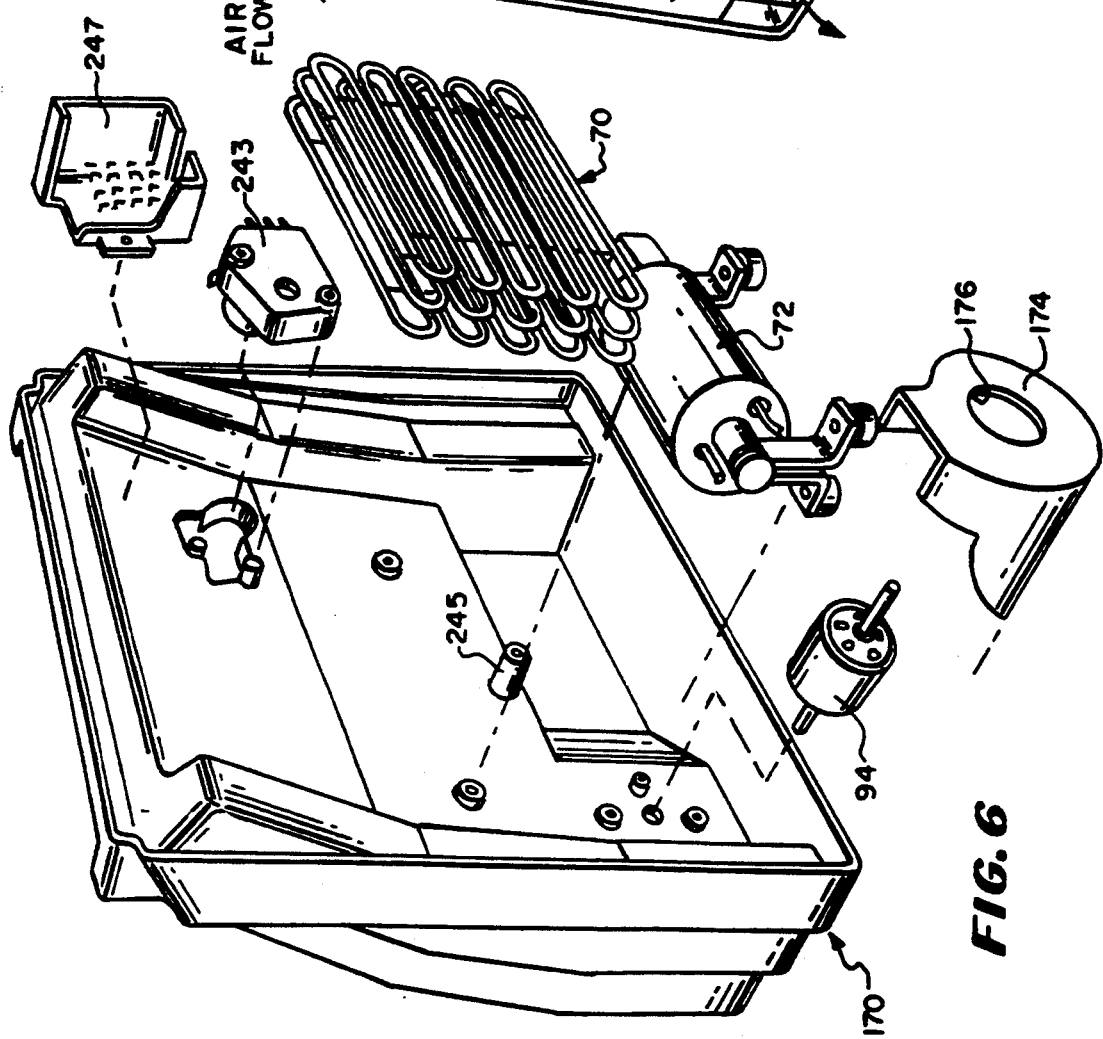
FIG. 6 is an exploded perspective view of the sealed unit of FIG. 5 showing the other side of the unit.

In accordance with an important aspect of the disclosed arrangement the right-hand side or end panel 60 is relatively thin and is of relatively light weight and yet contains all of the electrical, mechanical, and control components of the freezer 50 so that no hook-up or connections of any kind are required in assembling the freezer 50. More particularly, the right-hand side or end panel 60 contains within an inner wall 64 and an outer wall 66 (FIG. 4) thereof a complete mechanical refrigeration unit which includes an evaporator indicated generally at 68, a condenser indicated generally at 70 and a motor driven compressor indicated generally at 72 (FIG. 6) all of which are interconnected in a sealed refrigerant system. The right-hand side panel 60 also contains motor driven fans 74 and 76 for the evaporator 68 and condenser 70, respectively. The evaporator fan 74 is arranged to pull air from the interior of the freezer inwardly through the upper openings or louvers 78 in the inner wall 64, over the evaporator 68 so that the air is cooled and exhausts the cooled air into the interior of the freezer 50 through the lower openings 80 in the side wall 64 of the panel 60. The condenser fan 64 draws outside air inwardly through the openings 82 in the outer wall 66 and directs this air upwardly over the condenser 70 to cool the condenser 70, the heated air being exhausted through the upper openings 84 in the outer wall 66.

In order to seal the lid 62 to the upper edges of the panels 54–60 when the lid 62 is closed, a continuous gasket 98 (FIG. 21) is placed in grooves 98a formed in the upper edges of the panels 54, 56 and 58 and the groove 202 in the upper edge of the panel 60. The gasket 98 is engaged by a gasket 300 (FIG. 21) provided in the lid 62 so that the freezer compartment is tightly sealed when the lid 62 is closed.

In order to provide an access light which illuminates the interior of the freezer 50 when the lid 62 is open, the inner wall 64 of the panel 60 includes a translucent panel portion 86 behind which is positioned a light source 88. The light source 88 is controlled by a plunger type switch 90 (FIG. 3) which is mounted in the top wall of the panel 60 and is arranged to be controlled by a downwardly extending ridge 92 (FIG. 1) formed in the undersurface of the lid 62. When the lid 62 is opened, the ridge 92 releases the plunger switch 90 so that the light 88 is energized to provide illumination for the interior of the freezer 50. A power cord 93 extends outwardly from the outside wall and supplies electrical power to a fan motor 94 (FIG. 4), which drives the fans 74, 76 and the motor for the rotary compressor 72.

From this brief general description of the freezer 50 it will be seen that assembly of this freezer may be accomplished by relatively unskilled personnel and requires only the mounting of the side panels 54–60 on the base panel 52, mounting of the lid 62 on the rear wall 56 and plugging in the power cord 93 to provide an operative chest freezer.

Interlocking Surfaces And Seals Of Freezer 50

Before considering in detail the interlocking surfaces and seals provided in the disclosed arrangement to facilitate assembly of the modular panels of the freezer 50 to provide a tightly sealed freezer compartment, it should first be pointed out that in accordance with an important aspect of the disclosed arrangement the base 52, side panels 54–58 and lid 62 are all preferably formed by a twin sheet thermoforming process, described in more detail hereinafter, which permits the inclusion of intricate die formed ridges, troughs, grooves and shoulders in these panels so that accurately positioned interlocking surfaces and shoulders may be provided in the edges of these panels to permit ready assembly thereof without the use of special tools or fastening means. Considered very generally this twin sheet thermoforming process provides a panel, such as the front panel 54 having inner and outer walls 100 and 102 of sheet plastic which are die formed to the desired configuration and sealed together at the edges to form a hollow panel the interior of which is filled with an insulating material 104.

Considering first the manner in which the side panels 54–60 are assembled on the base panel 52, the base panel 52 is provided with elongated slots in the edges thereof, such as the elongated slots 106, 108 beneath the front panel 54 and the slots 110 and 112 beneath the left hand panel 58, these slots extending inwardly and downwardly at an angle to the vertical, as best illustrated in FIG. 8. The base panel 52 is also provided with an inwardly offset vertically extending wall portion 114 in which are formed outwardly extending projections 116 which are positioned outside the slots 106, 108 on the base panel 52, the bottom edges of the projections 116 forming interference shoulders which interlock with corresponding shoulders on the side panels to hold these panels tightly in place. More particularly, the side panels, such as the left-hand side panel 58 are formed with inwardly and downwardly extending tongue or locating tab portions 118 (FIG. 8) which are adapted to be inserted into the elongated slots 110, 112 in the base panel 52 to provide an accurately located interlocking arrangement between the side panels and the base panel. The side panels are also provided with recesses 120 in the inner vertical wall portion 122 thereof (FIG. 8), the recesses 120 defining interference shoulders 124 which are adapted to be engaged by and interlock with the projections 116 on the base panel 52. In this connection, it should be understood that the side panels, such as the side panel 58, are inserted into the base panel 52 by movement parallel to the elongated slots 110, 112, i.e., by movement along the direction of the arrow 126 shown in FIG. 8. Thus, the shoulders 124 are snapped into place behind the bottom edges of the projections 116 on the base panel 52 so that the side panel 58 is securely mounted on the base panel 52 without the use of special tools or separate retaining means. Preferably, the shoulders 124 and projections 116 have an interference overlap of approximately 0.050 inches, as illustrated in FIG. 8, to hold the side panels securely on the base panel 52. In this connection, it should be pointed out that the interference shoulders 116, 124 are shown for illustrative purposes only in solid lines in FIG. 8. These shoulders are actually positioned between the elongated slots 110 and 112 in the base member 52.

In order to interlock the adjacent edges of the side panels 54–60, the end panels, such as the end panel 58, are provided with a series of grooves 130 (FIG. 3) of any desired number in the vertical edge walls thereof which are adapted to receive corresponding tongues 132 formed in the corresponding edges of the front and rear panels 54 and 56. The grooves 130 and tongues 132 extend downwardly at an angle which is parallel to the elongated slots 110, 112 in the base panel 52. Accordingly, when the grooves 130 are fitted over the tongues 132 the locating tabs 118 are oriented at the right angle to be inserted into the elongated slots 110, 112 of the base panel 52. Thus, movement of the end panel 58 along the line 126 in FIG. 8 causes engagement of the tongue and groove interlocking means 130, 132 and at the same time the locating tabs 118 are inserted into the slots 110, 112 and the interference shoulders 124 are locked beneath the projections 116.

In order to tightly interlock the adjacent edges of adjacent side panels, an interference locking shoulder arrangement is also provided in these edges. More particularly, a series of vertically extending shoulders 134 are provided in the vertical edges of the end panel 58 intermediate the grooves 130 (FIGS. 3 and 10), the shoulders 134 being adapted to engage with cooperating vertically extending shoulders 136 (FIGS. 3 and 10) provided in the corresponding edge of the rear panel 56, and the front panel 54. Accordingly, as the grooves 130 are inserted over the tongues 132 in the rear panel 56, the shoulders 134 snap behind the shoulders 136 on the rear panel 56 and hold the side panel 58 securely connected to the adjacent edges of the front and rear panels throughout the length thereof.

Figure 9:
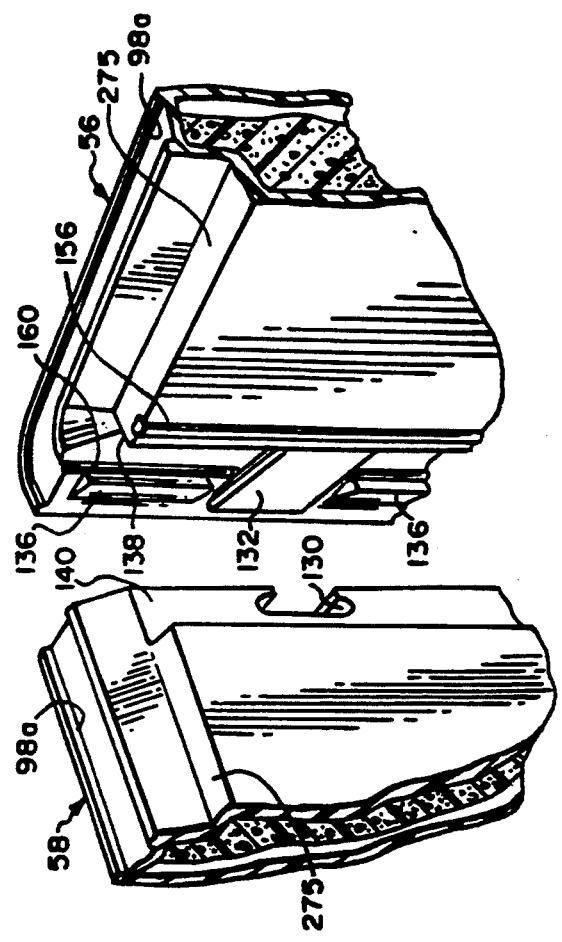
FIG. 9 is a fragmentary perspective view of the interlocking and sealing arrangement employed in the side panels of the freezer of FIG. 1.

In order to limit the inward movement of the side panel 58, as it is inserted on the base panel 52 and engaged with the front and rear panels 54 and 56, the front and rear panels 54 and 56 are provided with vertically extending limit shoulders 138 which cooperate with corresponding shoulders 140 (FIGS. 9 and 10) on the end panel 58 to limit inward movement of the end panel 58 as it is being mounted on the base panel 52 by movement in the direction of the arrow 126 in FIGS. 8 and 10.

In accordance with a further important aspect of the disclosed arrangement a dual sealing system is provided between the base panel 52 and the side panels and between adjacent edges of adjacent side panels to prevent a loss of cooling within the refrigerated compartment and to block solid and liquid debris from the panel interfaces. Referring first to the dual sealing arrangement provided between the base panel 52 and the side panels, such as the end panel 58, and referring particularly to FIG. 8, a first top opening trough 142 is provided in the outer edge of the base member 52 and a similar top opening trough 144 is provided in the outer edge of the inwardly offset portion 114 of the base member 52. The trough 142 is filled with gasket material 146 and the trough 144 is filled with gasket material 148. The gasket material 146 and 148 may be foamed in place at the time the base panel 52 is formed and filled with insulating material. Thus, the gasket material 146, 148 may comprise either foamed urethane or foamed silicone. In the alternative, the troughs 142, 144 may be filled with a solid gasket material which may comprise either solid silicone, solid vinyl or a solid rubber gasket.

In order to increase the effectiveness of the sealing gaskets 146 and 148, corresponding bottom edges of the side panels, such as the side panel 58, are provided with downwardly extending ridges 150 and 152 which engage with and compress the gasket material 146 and 148, respectively, as the side panel 58 is moved into place on the base panel 52.

In order to provide a similar dual sealing system between the adjacent vertical edges of the side panels, such as the adjacent edges of the side panel 58 and the rear panel 56, a vertically extending trough 154 is provided in the rear panel 56 inside of the limit shoulder 138, the trough 154 being filled with gasket material 156. Also, vertically extending troughs 158 are provided between the tongues 132 in the rear panel 56 and just inside of the locking shoulder 136 on this panel, the troughs 158 being filled with gasket material 160, as best illustrated in FIG. 10. As the side panel 58 is moved into place, the outwardly projecting shoulders 134 on the vertical edges thereof snap behind the corresponding vertically extending locking shoulders 136 of the rear panel 56, the shoulders 134 engaging and compressing the gasket material 160 within the troughs 158, as illustrated in FIG. 10. The vertical edges of the side panel 58 are also provided with vertically extending ridges 162 (FIG. 10) which are positioned inside the limit shoulders 140 on the vertical edges of the panel 58 and engage and compress the gasket material 156 in the troughs 154 when the side panel 58 is moved into place against the limit shoulders 138, 140. The gaskets 154 and 158 may either be foamed in place or comprise solid gasket material, as discussed in detail heretofore in connection with the gaskets 146, 148 on the base panel 52.

Lid Locking Arrangement

Figure 11:
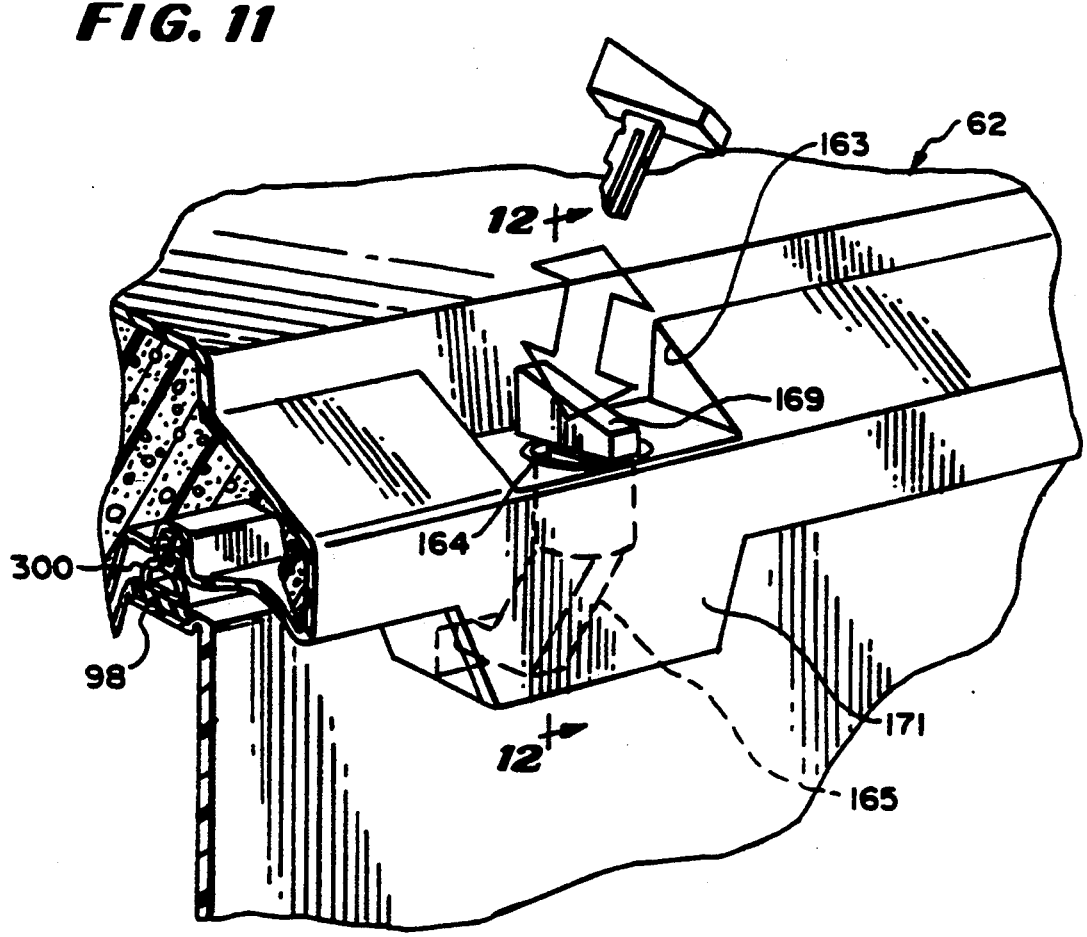
FIG. 11 is a fragmentary perspective view, on an enlarged scale, of the lid locking arrangement employed in the freezer of FIG. 1.
Figure 12:
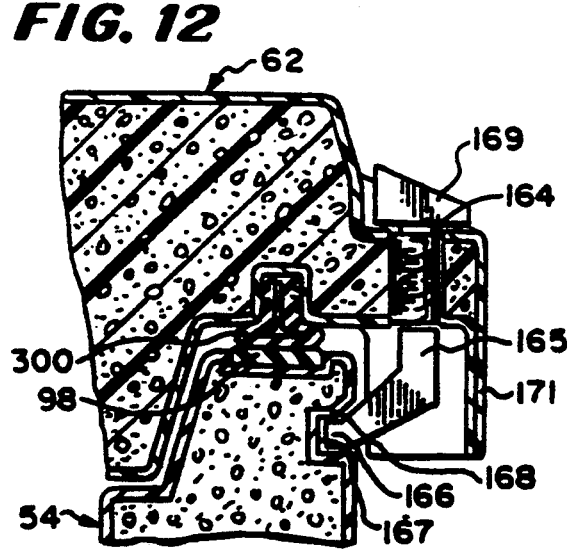
FIG. 12 is a sectional view taken along the line 12—12 of FIG. 11.
Figure 15:
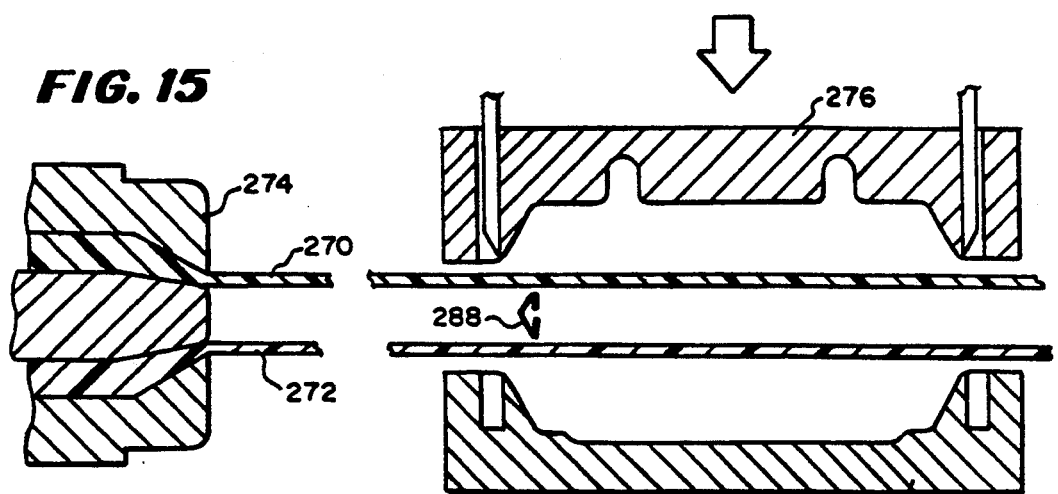
FIGS. 15-19 are diagrammatic illustrations of different steps in the twin sheet thermoforming process employed to manufacture the panels of the freezer of FIG. 1.

In accordance with a further important aspect of the disclosed arrangement, the lid 62 is provided with a locking arrangement whereby the lid 62 may be locked in place after it has been closed without requiring the provision of any holes in the front panel 54 which would reduce the insulation provided thereby. Furthermore, this lid locking arrangement is provided in the lid 62 and the front panel 54 as these panels are shipped to the final destination so that no assembly of parts is required in assembling the freezer 50. Thus, referring to FIGS. 11 and 12, the forward edge of the lid 62 is provided with a recess 163 within which is mounted a vertically extending cylinder type lock 164. A downwardly projecting arm 165 is connected to the rotatable portion of the lock 164, the arm 165 having an offset end portion 166 which moves into a groove 167 formed in the front wall of the front panel 54 when the lock 164 is rotated while the lid 62 is closed. Accordingly, when the arm 165 is moved to the position shown in FIG. 12, the offset end portion 166 thereof is positioned beneath the shoulder 168 formed by the top wall of the groove 157 in the front panel 54 so that the lid 62 is locked in place and cannot be opened. The lock 164 is arranged to receive a key 169. When the key 169 is rotated, the arm 165 is moved out of the groove 167 thus permitting the lid 62 to be opened. It will be noted that the disclosed arrangement does not require any holes through the front panel 54 or in the lid 62 inside of the sealing gasket 300 thereof, so that the insulation of these members is not compromised. Preferably the outer edge of the lid 62 is provided with a downwardly extending bracket portion 171 which covers the rotary arm 165 to prevent injury to the user's fingers when the lid 62 is closed and locked.

Side Wall Panel Containing Mechanical Refrigeration Unit

As discussed generally heretofore, the modular side panel 60 contains all of the electrical components for the sealed mechanical refrigeration system and controls therefor, and yet is relatively thin and of relatively light weight and is particularly suitable for use in the illustrated knockdown or demountable chest freezer wherein the side panels and base panels may be readily assembled to provide a complete refrigeration unit by relatively unskilled personnel. However, it should be pointed out that the modular side panel unit 60 which can be prebuilt, quality checked and then enclosed, may equally well be employed in other types of refrigeration apparatus either of the knockdown or demountable type, or refrigeration apparatus manufactured as a complete unit as original equipment.

Considering now in more detail the modular side panel unit 60, and referring to FIGS. 4 to 7, inclusive, a molded plastic divider wall indicated generally at 170 is positioned between the inner wall 64 and outer wall 66 of the panel 60 and extends generally vertically therebetween. A layer of foam insulation 172 is provided on the inner wall of the divider wall 170 and the evaporator 68 is mounted on the divider wall 170 inside of the insulation layer 172. The condenser 70 is mounted on the outside surface of the divider wall 170 and somewhat below the evaporator 68. A fan shroud 174, which is mounted on the outer surface of the divider panel 170 and surrounds the driving motor 94 and the condenser fan 76 which is of squirrel-cage configuration, is provided with an opening 176 which is in alignment with the lower openings 82 in the outer wall 66 of the panel 60 so that exterior air is sucked into the fan 76 and is directed by means of the shroud 174 upwardly through the coils of the condenser 70. The arrangement also provides some cooling for the compressor 72 which is mounted below the condenser coils 70 (FIG. 6) as the exterior air is forced over the condenser coil 70 and out of the upper openings 84 in the outer wall 66. A fan shroud 178 is also provided for the evaporator fan 74, the shroud 178 being mounted on the inner surface of the divider wall 170 and having a cover 179. The cover 179 has an opening 180 therein so that air which is pulled in through the upper openings 78 of the inner wall 64 and over the evaporator 68, through the opening 180 and into the fan 174, is directed laterally and forced out of the offset lower openings 80 (FIG. 3) in the inner side wall 64 of the panel 60.

Figure 4:
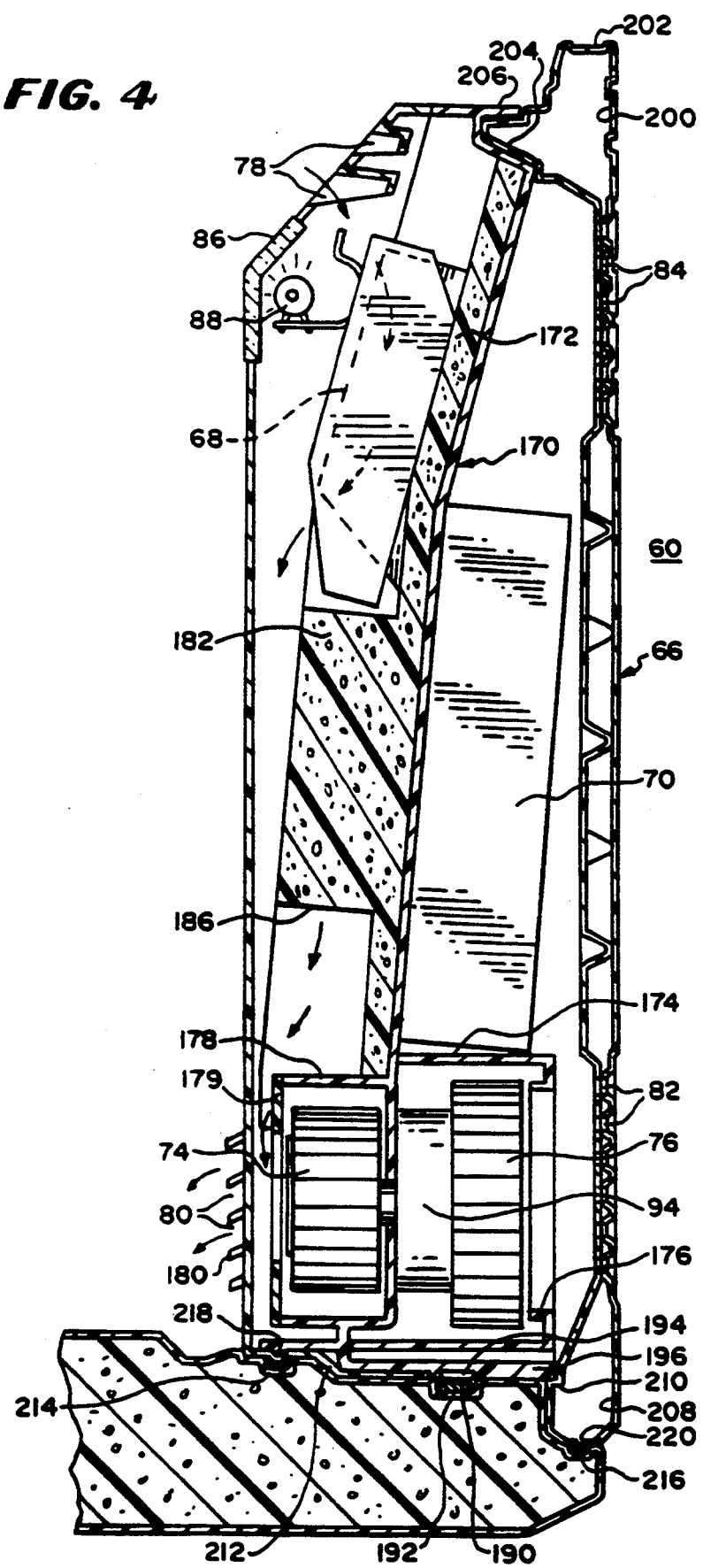
FIG. 4 is a sectional view taken along the line 4—4 of FIG. 3.
Figure 5:
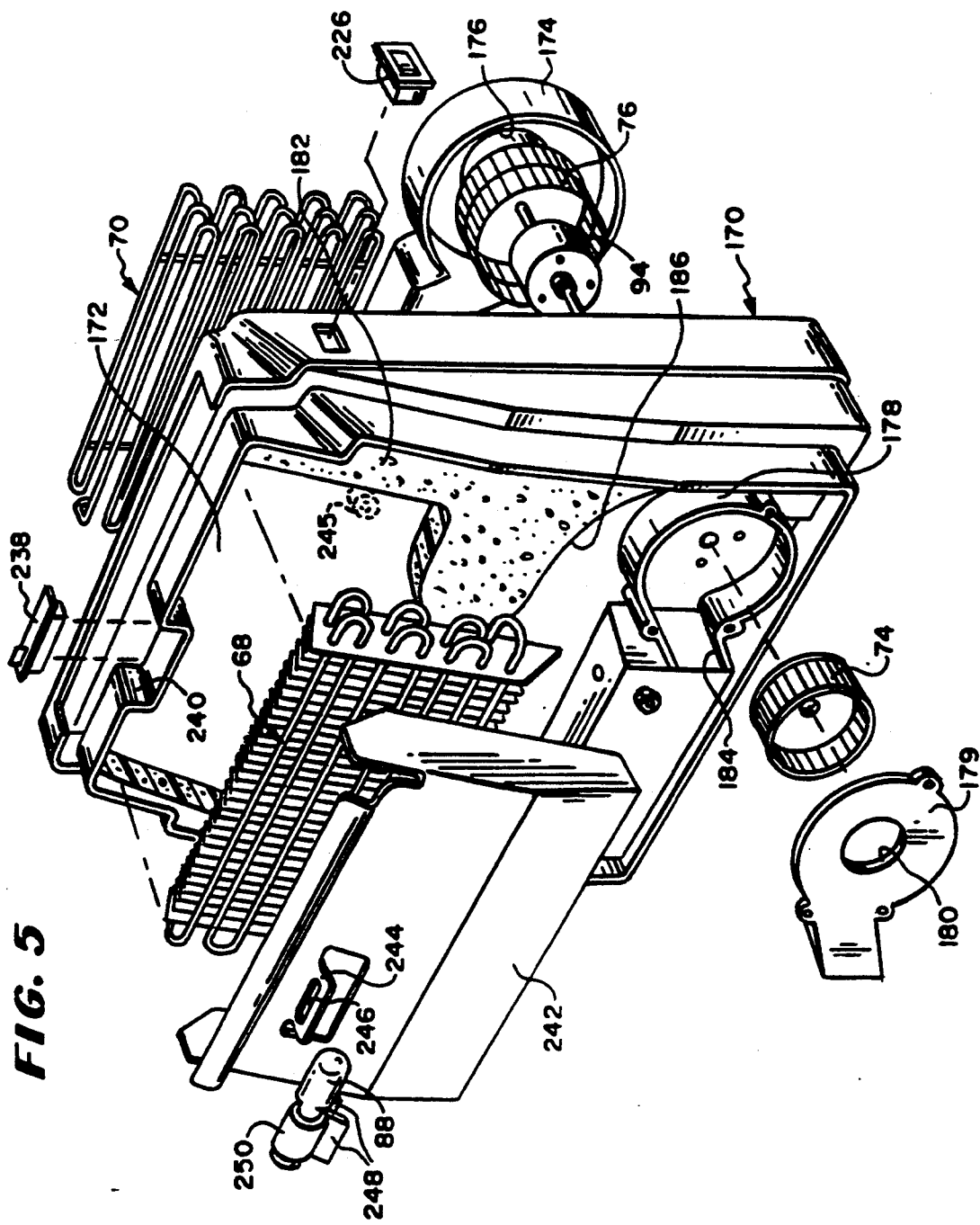
FIG. 5 is an exploded perspective view of the sealed refrigeration unit contained within one of the side walls of the freezer of FIG. 1.
Figure 7:
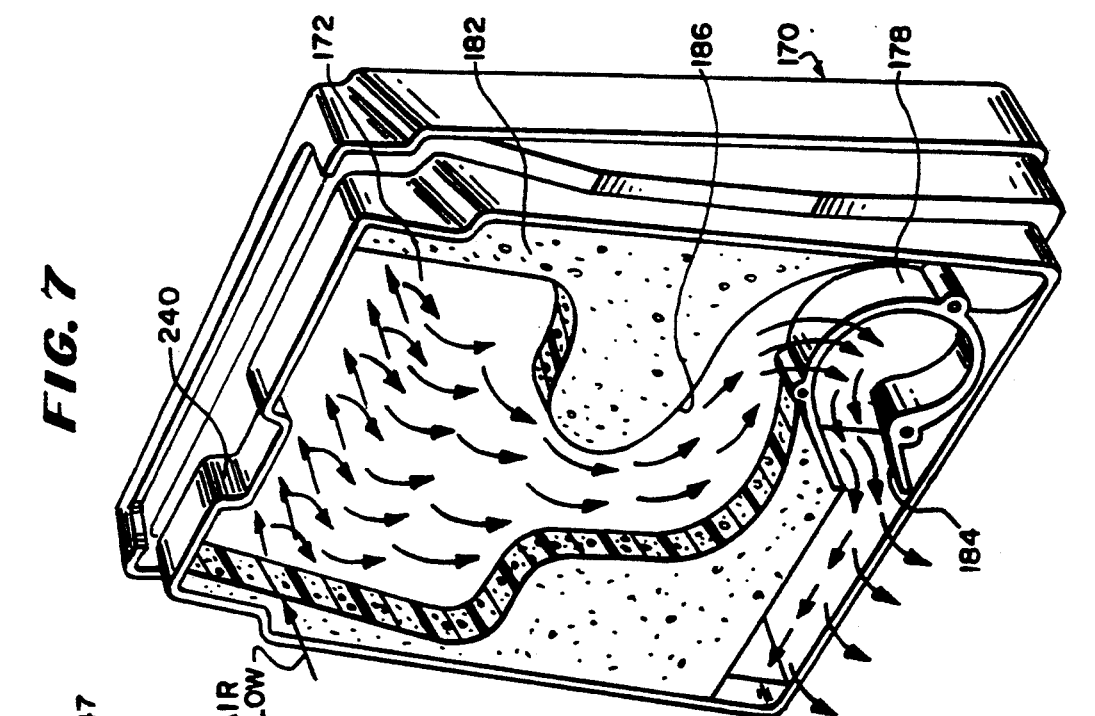
FIG. 7 is a fragmentary perspective view of the unit of FIG. 5 and illustrating the air flow path in the evaporator section of the unit.

In accordance with an important feature of the disclosed arrangement a second layer of foam insulation 182, which may be integral with the insulating layer 172, is shaped to surround the evaporator 68 and forms an air duct 186 (FIG. 7) which directs air, which has been pulled through the evaporator coils 68, into the opening 180 of the evaporator fan shroud 178. The fan 74 then directs this air through the outlet 184 of the shroud 178 and through the lower openings 80 in the inner wall 64 into the interior of the freezer 50. The foam layer 182 which forms the air duct 186 may be preformed and, thereafter, securely affixed, for example, by a suitable adhesive, to the divider wall 170 or may be molded in place or may be formed by the twin sheet thermoforming process discussed hereinafter as insulation formed in and assuming the configuration of an insulation cavity formed between and defined by the spaced apart interior surfaces of two spaced apart and interconnected plastic sheets, that is, the divider wall 170 and another plastic planar wall (not illustrated) at the outer planar surface of the foam layer 182 (as depicted in FIGS. 4, 5 and 7) and joined to the wall 170 during the twin-sheet thermoforming process.

In accordance with a further important feature of the disclosed arrangement, means are provided for sensing when the side panel 60 has been assembled on the base panel 52, this sensing means being employed to prevent the mechanical refrigeration unit in the panel 60 from being turned on until it is properly mounted in a vertical position on the base panel 52. More particularly, a permanent magnet 190 (FIG. 4) is mounted in a recess 192 in the base panel 52 in the area which will be covered by the side panel 60 when it is assembled on the base 52, as best illustrated in FIGS. 2 and 4. A conventional reed switch 194 is mounted in the transverse bottom wall portion 196 of the divider wall 170 (FIG. 4) and is positioned so that when the panel 60 is mounted on the base 52 the reed switch 194 will be actuated by the permanent magnet 190. Reed switch 194 is connected in series with the main on/off power switch 198 (FIG. 3), which is mounted in the top wall of the panel 60, so that power cannot be applied to the panel 60 until it has been mounted on the base panel 52.

The outer wall 66 of the panel 60 is preferably formed by the twin sheet thermoforming process to provide the upper openings 84 in the wall 60 and the lower openings 82. The wall 66 also includes an upper hollow portion 200 which is uninsulated and is provided with a trough 202 in the top wall thereof which is adapted to receive the sealing gasket 98. Portion 200 is also provided with an inwardly extending wall 204 which is generally V-shaped and is adapted to receive the transverse upper end 206 of the divider wall 170, which is of a similar configuration, so that the upper ends of the outer wall 66 and the divider wall 170 may be joined by any suitable plastic sealing process. The bottom end of the outer wall 66 is also provided with a hollow portion 208 that provides rigidity for the bottom edge of the outer wall 66 and includes a shoulder 210 which is adapted to receive the transverse bottom wall portion 196 of the divider wall 170, as best illustrated in FIG. 4. The upper end of the inner wall 64 is secured to the top portion 206 of the divider wall 170 by any suitable heat sealing arrangement and the bottom wall portion 212 of the inner wall 64 extends beneath the transverse wall portion 196 of the divider 170 and is sealed thereto by any suitable heat sealing process so that side panel 60 is a completely sealed modular unit.

In order to provide a dual sealing arrangement for the bottom edge of the side panel 60 which is similar to the dual sealing gaskets described in detail heretofore in connection with the other side panels of the freezer 50, the base panel 52 is provided with the troughs 214 and 216 which are filled with either foam or solid gasket material, the trough 214 being positioned beneath the wall portion 212 of the inner wall 64 and the trough 216 being positioned beneath the bottom end of the outer wall 66. Downwardly extending ridges 218 and 220 are provided in the wall portion 212 and in the bottom edge of the outer wall 66 which are adapted to engage and compress the gasket material within the troughs 214 and 216, respectively, when the side panel 60 is mounted on the base panel 52. The vertical side wall portions of the inner wall 64 are provided with downwardly extending slots 222 and 224 (FIG. 3) which are adapted to engage corresponding tongues 223, 225 (FIG. 2) in the inner walls of the front and rear panels 54 and 56 so as to interlock these side wall portions with the front and rear panels in the manner described in detail heretofore in connection with installation of the side panel 58. The side panel 60 which contains the mechanical refrigeration unit described heretofore, can readily be assembled onto the base panel 52 after the front and rear walls 54 and 56 have been assembled thereto by engagement of the grooves 222 and 224 with their corresponding tongues 223, 225 on these front and rear walls. At the same time the ridges 218 and 220 engage the gaskets within the troughs 214 and 216 so that a seal is provided between the unit 60 and the base panel 52. The base panel 52 is also provided with grooves 227 (FIG. 2) in the area beneath the bottom edge of the panel 60 which are adapted to receive corresponding tongues (not shown) on the bottom edge of the panel 60 as the panel 60 is moved inwardly and downwardly onto the base 52. In order to seal the vertical edges of the panel 60 to the front and rear walls 54, 56 these edges are provided with gaskets which engage vertically extending limit shoulders 229 (FIG. 2) as the panel 60 is moved inwardly against these shoulders. The limit shoulders 229 correspond to the limit shoulders 138 (FIGS. 3 and 9) on the front and rear panels 54, 56 which limit inward movement of the side panel 58.

Figure 13:
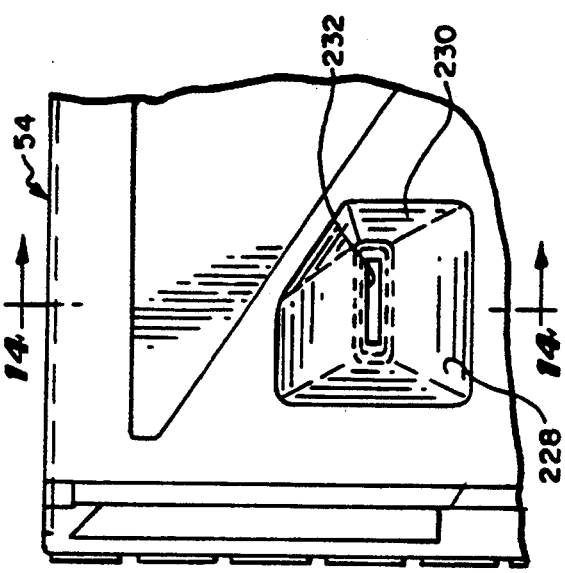
FIG. 13 is a fragmentary rear view of the front panel of the freezer of FIG. 1 showing the upper left hand corner of the rear side of said front panel.
Figure 14:
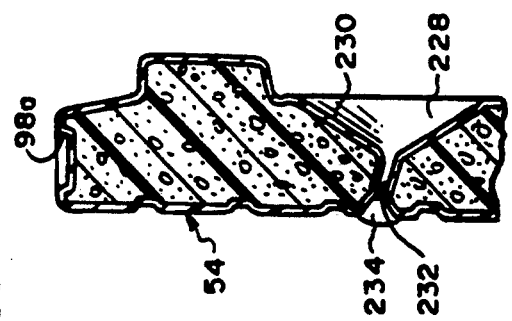
FIG. 14 is a sectional view taken along the line 14—14 of FIG. 13.

In accordance with a further important feature of the disclosed arrangement, a light source 226 (FIGS. 3 and 5) in the front wall of the divider panel 170 is positioned so that when the unit 60 is interconnected with the base 52 and front panel 54 the light source 226 directs light outwardly through an opening 228 in the front wall 54, as best illustrated in FIGS. 13 and 14. The opening 228 is provided with sloping side walls 230 to direct light through a smaller opening 232 in the remainder of the front panel 54 to a lens 234 which is mounted in the outer end of the light tube 232. Source 226 is arranged to be energized when the main power switch 198 is turned on so that a visual indication is provided to an outside observer during periods when the power is applied to the freezer 50. Preferably the lens 234 may be amber colored to provide a suitable indicating light that the mechanical refrigeration unit is turned on.

The controls for the side panel 60, which include the plunger type switch 90 for the access light 88 and the power on/off switch 198 are mounted on the upper wall portion 206 of the divider wall 170 and all of the electrical connections to these components are included within the panel unit 60. In addition, a multiposition slide type power level switch 236 (FIG. 3) is also mounted on the upper wall 206 of the divider wall 170 and cooperates with the thermostat 238 mounted in a recess 240 formed in the upper wall 206 to control the level of refrigeration within the freezer 50, in a manner readily apparent to those skilled in the art. An aluminum heat shield 242 (FIG. 5) is mounted on the divider wall 170 and surrounds the evaporator coils 68. The heat shield 242 is provided with an outwardly extending tab portion 244 having a slot 246 therein which is adapted to receive clip portions 248 of the light socket 250 for the lamp 88. If desired, a suitable calrod heating unit (not shown) may be positioned within the shield 242 and controlled by a timer 243 (FIG. 6) mounted on the divider wall 170 to provide an automatic defrost cycle in a conventional manner. An outlet tube 245, which is mounted on the divider wall 170, acts as a drain for water accumulated during the defrost cycle. The tube 245 may extend through a suitable opening (not shown) in the outer wall 66 of the panel 60. A terminal block 247 is also mounted on the divider wall 170 and is employed to establish the required electrical connections within the panel 60.

In accordance with a further important aspect of the disclosed arrangement, a plunger type switch 252 (FIG. 3) is mounted on the forward edge of the upper wall 206 of the side panel 60 and is employed to detect when the lid 62 of the freezer 50 has been left ajar. More particularly, the switch 252 is provided with a set of normally closed contacts 254 (FIG. 3A). The plunger type switch 90 at the back of the panel 60, which controls the access light 88, is also provided with a second set of normally opened contacts 256 which are connected in series with the contacts 254 to a power source 258. The relay coil of a time delay relay 260 is connected in series with the contacts 254 back to the other side of the power source 258. The relay contacts of the time delay relay 260 are arranged to energize an alarm 262 in the event that both of the sets of contacts 254 and 256 are closed and the time delay established by the relay 260 has expired. When the lid 62 is open, the contacts 254 and 256 have the position shown in FIG. 3A. When the lid 62 is closed the contacts 256 are always closed because of the proximity of the switch 90 to the hinge edge of the lid 62. However, since the switch 252 is mounted near the front edge of the lid 62 the contacts 254 of the switch 252 may not be opened unless the lid is closed sufficiently to actuate the switch 252. Accordingly, if the lid 62 is left slightly ajar by an amount such that the plunger of the switch 252 is not depressed a sufficient amount to open the contacts 254 of the switch 252, the relay 260 is energized and, after the predetermined delay established by the relay 260 has expired, the alarm 262 (FIG. 3A) is energized. The alarm 262 may either be an audible alarm or a flashing of the light source 226 which is visible through the front panel 54 of the freezer 50 (FIG. 3B) as described in detail heretofore. The arrangement of FIG. 3A thus provides an audible or visual indication to the user that lid 62 of the freezer 50 has not been tightly closed, i.e., by an amount sufficient to open the contacts 254 of the switch 252.

If desired, an alternative arrangement may be provided for detecting when the lid 62 has been left ajar. Referring to FIG. 3B, a differential pressure switch 264 may be provided with the normally closed contacts 266 which are opened when a predetermined pressure differential is established between the inside of the freezer 50 and the exterior thereof. When the lid 62 of the freezer 50 is open, warm air enters the freezing compartment; and, after the lid is closed again, it takes several seconds to reestablish a vacuum, i.e., to provide a lower pressure within the freezing compartment of the freezer 50. During periods when the lid 62 is opened, the contacts 266 of the pressure differential switch 264 are closed because the pressure within the freezer 50 is the same as exterior air pressure. However, if the lid 62 is tightly closed, the pressure is soon reduced within the freezing compartment of the freezer 50 and the contacts 266 open. If this occurs before the end of the time delay established by the time delay relay 260, the alarm 262 is not energized. However, if the lid 62 has been left ajar, the contacts 266 will not be opened and an alarm will be given at the end of the delay established by the relay 260. In other respects the circuit arrangement of FIG. 3B is identical to that described heretofore in connection with FIG. 3A. The pressure differential switch 264 may, for example, be mounted on the divider wall 170 at a point where one side of the switch is exposed to exterior or ambient air, the other side of this switch 264 communicating with the interior of the freezer 50 through a suitable sensing tube.

Forming Freezer Panels By Twin Sheet Thermoforming Process

As discussed generally heretofore, the base panel 52 and the side panels 54, 56 and 58, and the lid 62 are all preferably formed by employing a twin sheet thermoforming process. Such a process is believed to be old, per se, in fields other than the domestic or household appliance field. However, applicants believe they are the first to use such a process in domestic or home appliances, particularly where thermal conductivity through the panel is important, as in the illustrated chest freezer 50.

Referring now to FIGS. 15-19 wherein the individual steps of the twin sheet thermoforming process of the disclosed arrangement are illustrated diagramatically, first and second sheets of plastic material 270 and 272 are extruded from the extrusion head 274 and are immediately positioned between two opposed open die members 276 and 278 of a die thermoforming fixture, the die members 276, 278 having formed on the internal surfaces thereof the desired configuration of the inner and outer walls of the final panels. The die members 276 and 278 are then closed to the position shown in FIG. 16 and air is admitted into the space 280 between the opposed sheet portions 270a and 272a so that these plastic sheets are forced outwardly into the internal surfaces of the die members 276 and 278 to form the desired shape of the final panel. In the alternative, the plastic sheets 270a and 272a may be sucked outwardly against the internal surfaces of the die members 276 and 278 by applying a suitable vacuum through holes in the die members.

Figure 16:
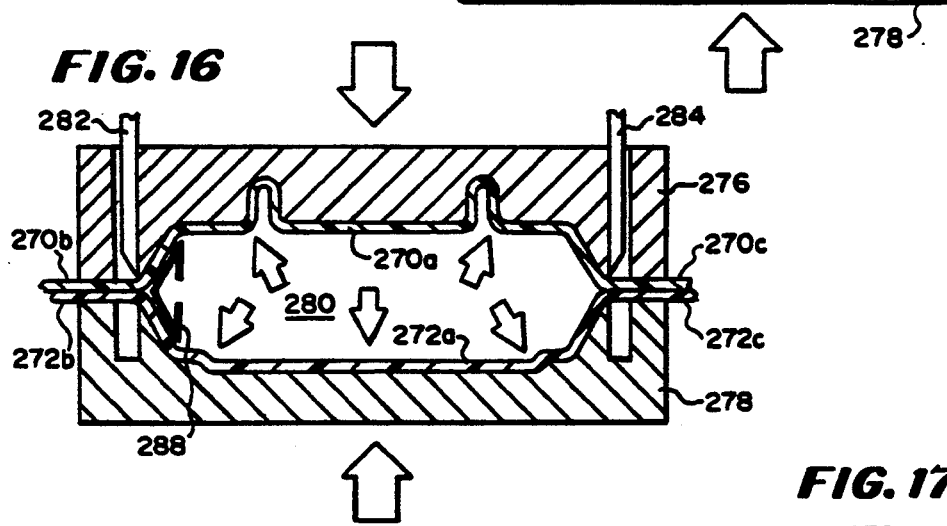
Figure 17:
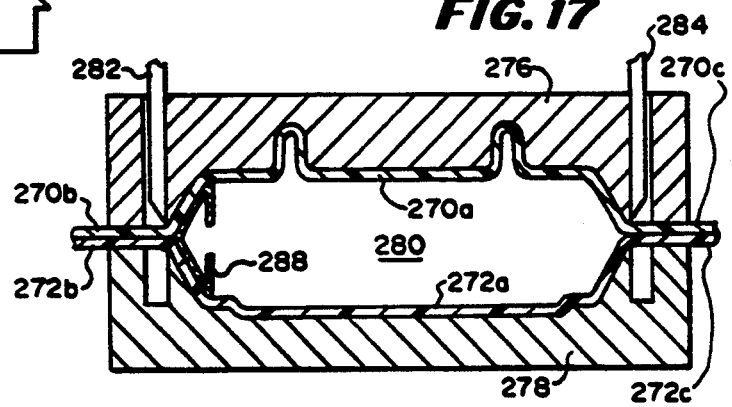
Figure 18:
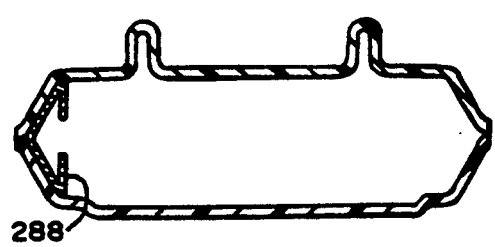

When the die members 276 and 278 are closed, the edges 270b and 270c of the sheet 270a are sealed with the edges 272b and 272c of the sheet portion 272a to form a completely sealed hollow panel, as shown in FIG. 16. The knives 282 and 284, which are mounted in the upper die member 276, are then moved downwardly to trim the edge portions 270b, 270c and 272b, 272c from the hollow panel so as to provide the finished panel indicated in FIG. 18. The sheets 270 and 272 may be of any suitable plastic material, for example, a polyvinylchloride, an acrylonitrile butadiene styrene (ABS) polymer or a high impact polystyrene.

Figure 19:
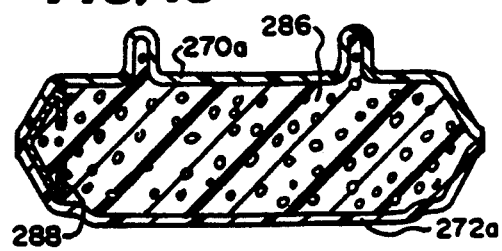

When the thermal conductivity through the panel side walls is important, the space 280 between these side walls may be filled with an insulating material 286 (FIG. 19). In such case, the die thermoforming fixture 276, 278 is moved to a foam machine where foam insulation is introduced preferably while the side walls 270a and 272a are positioned within the die members 276 and 278, this foam insulation being introduced through a suitable opening in one of the die members. The insulation may be foamed in place while the side panels 270a and 272a are supported by the internal surfaces of the die members 276 and 278 so that the side panels are prevented from being deformed while the foam insulation is being introduced. In the alternative, the insulating material 286 may comprise a rigid insulation panel which is introduced between the sheets 270 and 272 before the die members 276 and 278 are closed. This rigid insulation panel may comprise polystyrene bead board which under pressure and temperature expands to fill the space 280 between the side walls 270a and 272a.

In accordance with a further important aspect of the twin sheet thermoforming process of the disclosed arrangement, one or more inserts, which may be of metal or other rigid material, may be provided between the inner and outer sheets 270a and 272a to provide rigidity or stiffness in desired areas of the panel or to provide a suitable metal insert which can be used for mounting components, such as hinges, to the final panel. For example, the triangularly-shaped metal insert 288 (FIG. 15) may be positioned between the twin plastic sheets 270 and 272 while they are spaced apart between the open die members 276 and 278 when the die thermoforming fixture is closed to the position shown in FIG. 16. The insert 288 is then positioned adjacent one end wall of the space 280 between the panel sheets 270a and 272a.

Utilization of the above-described twin sheet thermoforming process in forming either hollow or insulated panels suitable for use in the domestic or home appliance field has many advantages, particularly when such process is used to manufacture the base lid and side panels of the illustrated chest freezer 50. Thus, the base panel 52 and the side panels 54, 56 and 58 may be manufactured in one operation while providing all of the above-described complex interlocking surfaces, gasket ridges and troughs, and, if desired, foamed gasket insulation as well. By utilizing the described process, light weight, rigid panels having the desired thermal insulation and yet including the complex interlocking surfaces required for assembling these panels together in the manner described in detail heretofore, may be provided by means of the die members 276 and 278. Furthermore, this single manufacturing operation can also provide the basket supporting ledges 275 and 277 on the front and rear panels 54 and 56, the top grooves 98a and 202 for the gasket 98, the ornamental trim corrugations 279 on the upper portions of the outer walls of the panels 54–60, and the ridges 281 on the base panel 52 which provide air passages between the food and the floor of the freezer compartment and promote a more uniform temperature within the freezer 50. Accordingly, the total number of parts is greatly reduced and secondary operations such as welding, painting and sealing may be eliminated.

The plastic sheets 270 and 272 may also be of different plastic materials in situations where plastic material having one set of characteristics is desired for the outer wall of the panel, and a plastic material having different characteristics is desired for use as the inner wall of the panel. For example, a rigid, high impact plastic material may be used for the outer wall of the panel, whereas a smoother or softer plastic material, which is easy to clean, may be used for the inner wall of the panel. In addition, the plastic sheets 270 and 272 may comprise plastic materials of different colors where a particular color is required for the outside of the freezer and a different color for the interior of the freezer. Also, these sheets of plastic of different colors may have different physical characteristics, as described above, if desired. Furthermore, the entire exterior of the freezer 50 is non-corrosive since it is formed by the outer walls of the twin sheet thermoformed panels which are of plastic material.

The described twin sheet thermoforming process particularly lends itself to the provision of foam insulation between the side walls of the panel which may be foamed in place, preferably while the plastic sheets are backed up by the die members 276 and 278, as described heretofore. In addition, the provision of metal inserts which are incorporated while the panel is being formed is particularly desirable for mounting components on the finished panel during the manufacturing process and before the panel is shipped to its final destination for assembly.

One example of the use of such inserts is shown in connection with the provision of hinges for the lid 62, as shown in detail in FIGS. 20 and 21. Referring to these figures, the metal insert 296 is provided along the rear edge of the lid 62, the insert 296 being positioned between the side walls 62a and 62b of the panel 62 while this panel is being formed and the insulation 62c foamed in place therebetween so that the insert 296 is rigidly held in place within the lid 62. Bottom wall 62b of the lid 62 is also provided with the trough 298 (FIG. 20) around the periphery thereof which is adapted to receive the upper sealing gasket 300 which cooperates with the gasket 98 provided in the top grooves of the side walls of the freezer 50 to provide a tight seal around the perimeter of the lid 62. A pair of upper hinge brackets 302 are mounted on the rear edge of the panel 62 by means of the bolts 304. A hinge pin 306 is positioned between the side walls of the upper hinge bracket 302 and extends outwardly therefrom to pivotally mount the upper flange portions 308 of a pair of lower hinge brackets indicated generally at 310.

In order to provide a simple mounting arrangement for securing the lower hinge brackets 310 to the upper edge of the rear panel 56 of the freezer 50, a metal insert indicated generally at 312 is positioned between the side walls 56a and 56b of the rear panel 56 while the panel 56 is being formed and before the insulation 56c has been added. Accordingly, the insert 312 is rigidly held in place along the upper edge of the panel 56 and may have the nuts 314 secured to the inner surface of the back wall 316 of the insert 312. All that is then required to mount the lid 62 on the rear panel 56 is to insert the bolts 318 through the openings 320 in the outer wall 322 of the lower bracket 310 and to thread these bolts into the nuts 314 on the metal insert 312. Preferably, the openings 320 in the outer bracket wall 322 are elongated to provide slots so that the lid 62 may be leveled on the upper edge of the rear panel 56 as it is assembled thereto.

In order to provide an arrangement for biasing the lid 62 upwardly to facilitate opening thereof and to hold it in an upper open position, a pair of U-shaped members 324 are slidably mounted over a rod 326 which extends between the side walls of the lower hinge bracket 310, the upper ends of the U-shaped members 324 engaging a pin 327 which extends between the side walls of the upper bracket 302 when the upper and lower brackets 302 and 310 are assembled together. A coil spring 328 is positioned around each of the U-shaped members 324 and extends between outwardly extending flanges 330 and 332 provided along the length of the U-shaped member 324. When the lid 62 has the closed position shown in FIG. 20, the springs 328 are compressed. Since the pin 327 is offset relative to the hinge pin 306, the spring 328 facilitates lifting of the lid 62 to the upper position shown in FIG. 21. When the lid 62 is in the position shown in FIG. 21, the springs 328 are fully extended and provide sufficient force to hold the lid 62 in the open position. It should be noted that all of the hinge parts may be assembled to the lid 62 before the lid is shipped to the point of assembly. Accordingly, all that is required in assembling the lid 62 onto the rear wall 58 is inserting the bolts 318 into the nuts 314 while the lid 62 is resting on the gasket 98.

ALTERNATIVE TWIN SHEET THERMOFORMED PANEL EMBODIMENTS

In order to illustrate the versatility of the twin sheet thermoformed process of the present invention and the adaptability of twin sheet thermoformed panels to a wide range of domestic appliances, a number of alternative embodiments will be described in sufficient detail to illustrate the features and advantages of employing twin sheet thermoformed panels in different types of domestic appliances. The advantages in employing the twin sheet thermoforming process which have been described in detail in connection with the chest freezer 50 also apply to these alternative embodiments. In addition, other advantages which are unique to the particular appliance will be pointed out in connection therewith.

Dehumidifier Using Twin Sheet Thermoformed Panels

Figure 22:
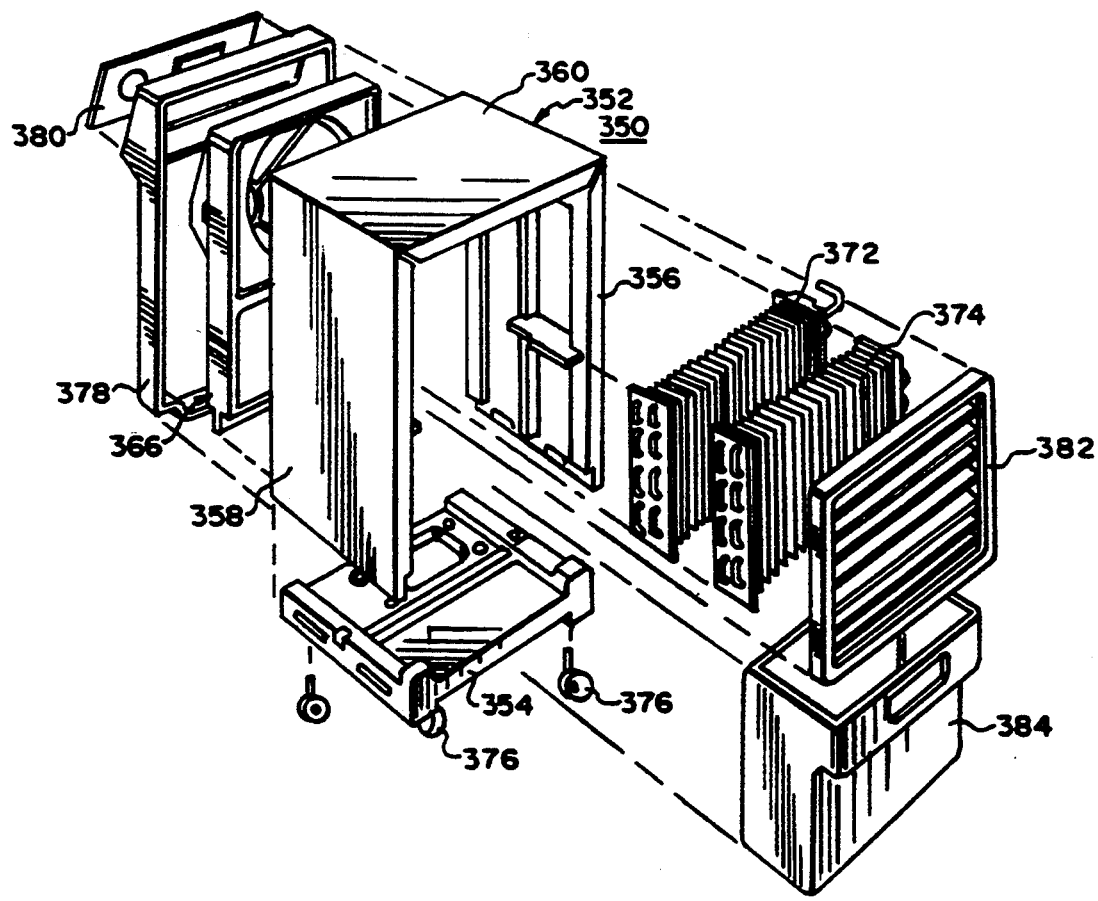
FIG. 22 is an exploded perspective view of a dehumidifier which incorporates panels formed by the process of the present invention.
Figure 23:
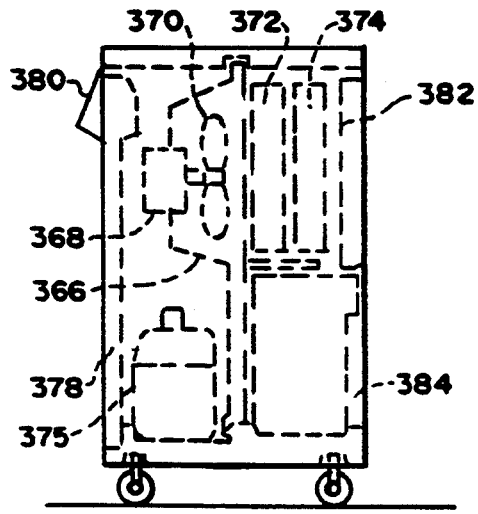
FIG. 23 is a left side view of the dehumidifier of FIG. 22.
Figure 24:
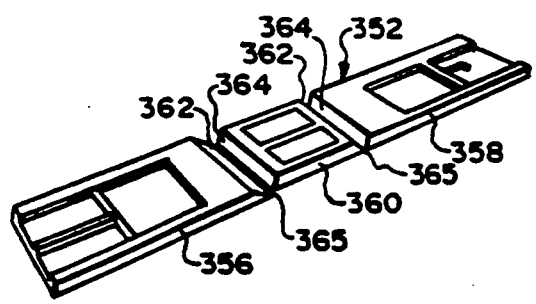
FIG. 24 is a perspective view of the tri-fold panel which forms the top and side walls of the dehumidifier of FIG. 22.

Referring to FIGS. 22–24, inclusive, a dehumidifier arrangement is shown therein which employs the twin sheet thermoforming process of the present invention. More particularly, the dehumidifier indicated generally at 350 includes an exterior cabinet indicated generally at 352 which is arranged to be snapped into place on a molded plastic base member 354. More particularly, cabinet 352 is a one-piece three panel folded shell arrangement which embodies the side walls 356 and 358 and the top wall 360, this one-piece molding being shown in FIG. 24 in the condition in which it is originally molded by the twin sheet thermoforming process described in detail heretofore. As best illustrated in FIG. 24, the top wall 360 is interconnected with the side walls 356 and 358 by 45° end walls 362 and 364, these end walls being connected by thin flexible plastic hinge portions 365 so that the side walls and top wall can be folded to the final position shown in FIG. 22 in which they form the top and side cabinet walls of the dehumidifier 350. The hinge portions 365 are formed by providing corresponding meeting edges along these hinge lines in the upper and lower die members 276 and 278 so that when these die members are closed the sheets 270 and 272 are sealed not only along the outer edges thereof but also along these intermediate hinge lines to provide all three panels 356, 368 and 360 during a single manufacturing operation which are interconnected by the flexible hinge portions 365.

A molded plastic divider wall 366 is arranged to be installed on the base 354 before the exterior cabinet 352 is mounted thereon, the divider wall 366 being arranged to interlock with the side panels 356 and 358 when the exterior cabinet is assembled thereon. The divider wall 366 provides a mount for the fan motor 368, the fan 370 of which directs air over the condenser 372 and evaporator 374. The lower edges of the side panels 356 and 358 may be snapped into place on the base 354 by means of any suitable interlocking arrangement, such as that described in detail heretofore in connection with the chest freezer 50. The base 354 also supports the compressor 375 of the dehumidifier unit; the casters 376 may be secured to the base 354 in any suitable fashion. A decorative front grill 378 is of molded plastic and may include a control panel 380 secured to the front of the cabinet 352. A rear grill 382 is arranged to be snapped into place on the rear edges of the cabinet 352 above a molded plastic water bucket 384. The one-piece folded shell 352 may be foamed in place to provide additional strength, or, in the alternative, supports can be molded in the structure at the time of its manufacture to obtain additional strength, as described in detail heretofore in connection with the chest freezer 50. The entire cabinet of the dehumidifier of FIGS. 22–24 utilizes a plastic exterior housing; and the cabinet as well as the divider wall 366 and the bucket 384 may be molded in accordance with the thermoforming process discussed hereinabove. The dehumidifier 350 has an exterior that is non-corrosive, can be assembled by automation, and includes only a small number of parts due to the interlocking surfaces provided in the twin sheet thermoformed cabinet panel 352 and the base member 354. Also, such an arrangement may reduce the need for certain secondary manufacturing or assembly operations, such as welding, painting and sealing.

Humidifier Using Twin Sheet Thermoformed Panel Construction

Figure 25:
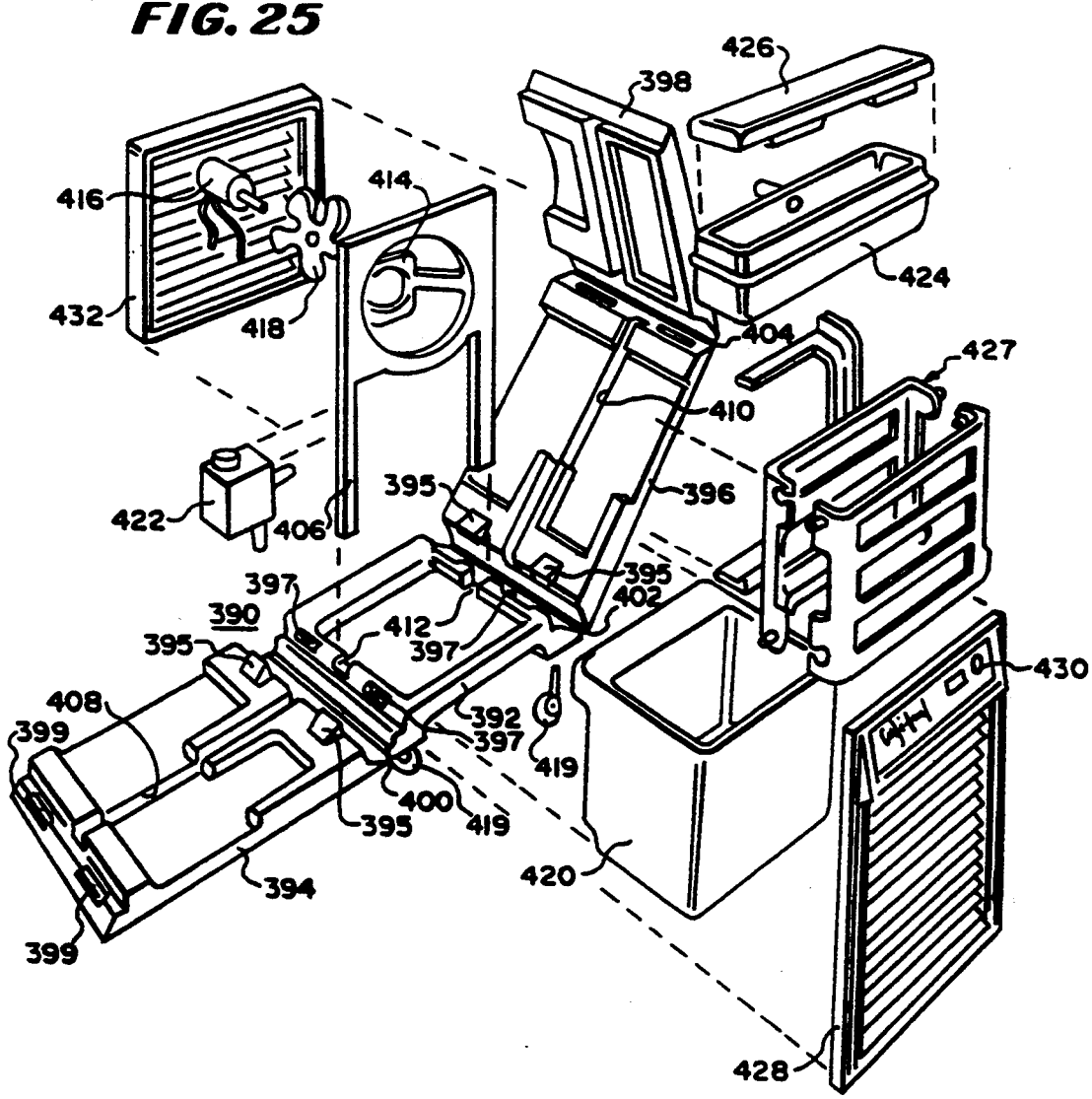
FIG. 25 is an exploded perspective view of a humidifier which incorporates a plurality of interconnected panels formed by the process of the present invention.

Referring to FIG. 25, a humidifier, indicated generally as 390, is disclosed and includes an outer cabinet constructed using a one-piece four panel folded shell arrangement. More particularly, the base panel 392, the side panels 394 and 396 and the top panel 398 are all formed in a single twin sheet thermoforming operation which is similar to that described in detail heretofore in connection with the one-piece cabinet 352 of the dehumidifier of FIG. 22. The base 392 is connected by a flexible hinge portion 400 to the side wall 394 and by the flexible hinge portion 402 to the side wall 396. The side wall 396 is also connected through the flexible hinge portion 404 to the top wall 398 of the cabinet of the humidifier 390.

In order to securely lock the side panels 394 and 396 to the base panel 392 after the side panels have been folded to their final positions along the hinge lines 400 and 402, the side panels 394 and 396 have interlocking shoulders 395 integrally formed therein during the initial manufacturing operation which are positioned to engage and interlock with corresponding openings 397 in the meeting edges of the base panel 392. The edges of the side panel 396 and top panel 398 along the hinge line 404 are also preferably provided with similar interlocking means for holding these panels in assembled position. Also, the upper edge of the side panel 395 is provided with interlocking shoulders 399 which engage corresponding openings (not shown) in the edge of the top panel 398 to securely lock these panels together. In this connection it should be noted that a similar interlocking arrangement may also be provided along the hinge lines 365 between the panels 356, 360 and 358, 360 in the dehumidifier of FIGS. 22–24.

A plastic divider wall 406 is arranged to be mounted in the grooves 408 and 410 formed in the side walls 394 and 396, respectively, and in the slots 412 in the base member 392. The divider wall 406 is provided with an offset spider portion 414 which is arranged to mount the fan motor 416 and fan 418. The side panels 394 and 396 provide a mount for and contain a molded plastic water bucket 420 and water pump 422 thereon. These side panels also mount and contain the water tub 424 and its cover 426. A media holder 427 of two-piece molded snap together construction is mounted beneath the water tub 424. A decorative molded plastic front grill 428, which is provided with a control panel 430, is arranged to be snapped into place on the front edges of the side walls 394, 396 and top wall 398. A decorative rear grill 432 is also arranged to be snapped into place on the opposite edges of the side walls 394, 396 and the top 398. The panels 392, 394, 396 and 398, which form the base, side walls and top of the cabinet of the humidifier 390, may be foamed in place to provide additional strength, or, in the alternative, supports can be molded in the structure at the time of its manufacture to obtain additional strength. Also, the casters 419 may be molded into the base 392 at the time of manufacture or otherwise securely affixed to the base 392.

Figure 26:
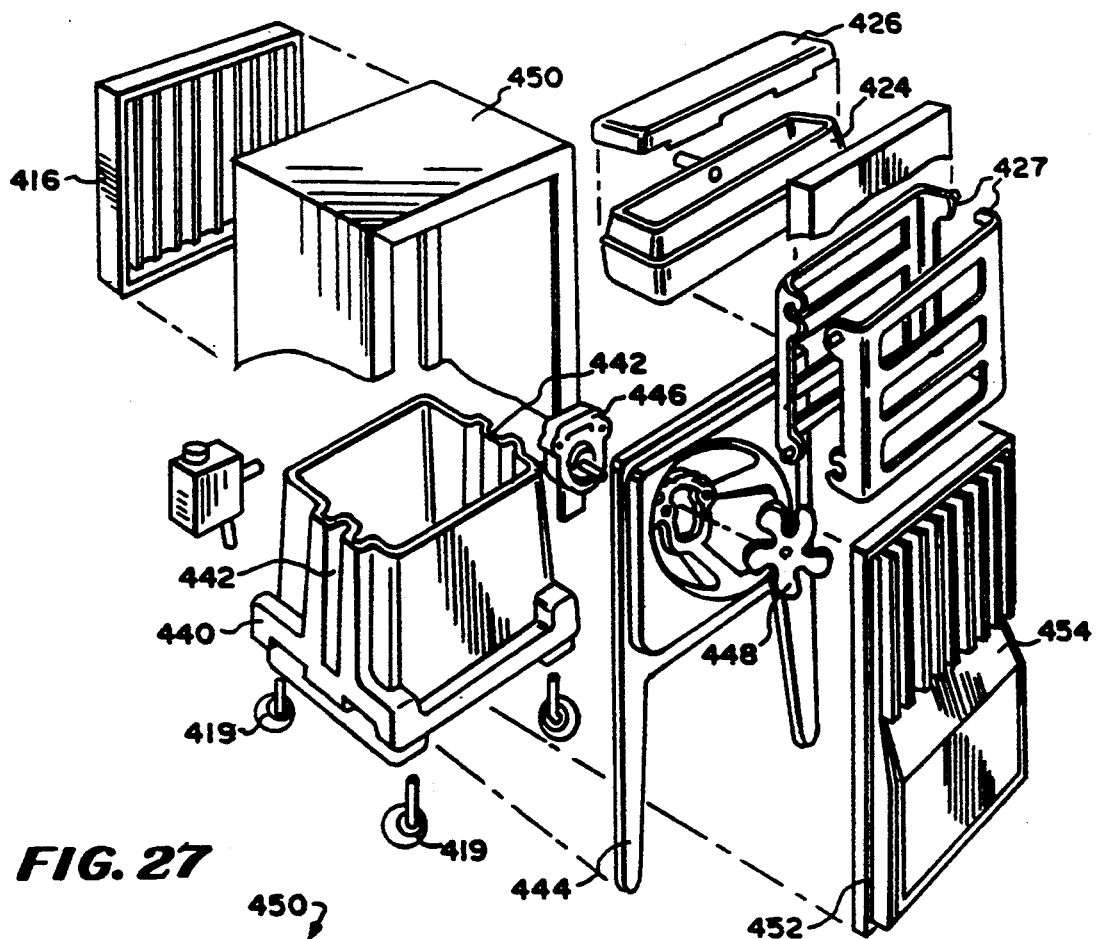
FIG. 26 is an exploded perspective view of a humidifier which incorporates panels formed by the process of the present invention.
Figure 27:
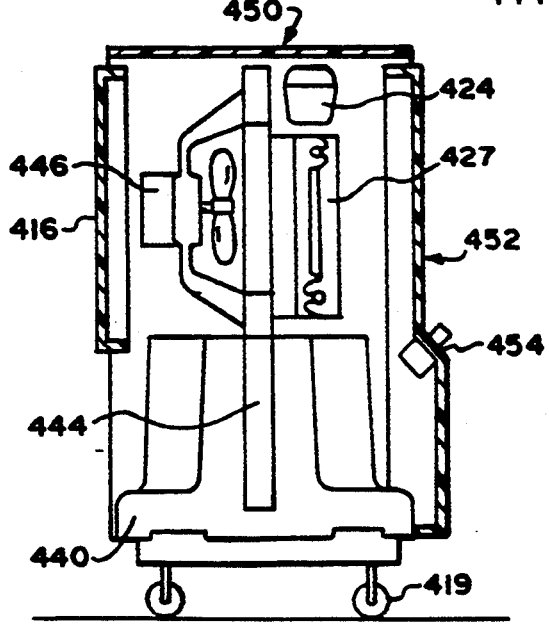
FIG. 27 is a side elevational view, partly in section, of the humidifier of FIG. 26.

FIGS. 26 and 27 disclose an alternative humidifier design wherein a base member 440 is provided with vertically extending grooves 442 which are arranged to mount a molded plastic divider wall 444 on which the fan motor 446 and fan 448 are mounted. A one piece three panel folded shell exterior cabinet 450, which may be constructed by the twin sheet thermoformed process, or, in the alternative may be of sheet metal, is arranged to be mounted on the base member 440. Preferably, the base 440, which acts as a water bucket for the humidifier, and the front grill 454 are formed by the twin sheet thermoforming process described in detail heretofore. In other respects the humidifier of FIGS. 26 and 27 is substantially identical to the arrangement of the humidifier of FIG. 25 and similar reference numerals have been given to corresponding components.

Window Air Conditioner Using Twin Sheet Thermoformed Panels

Figure 28:
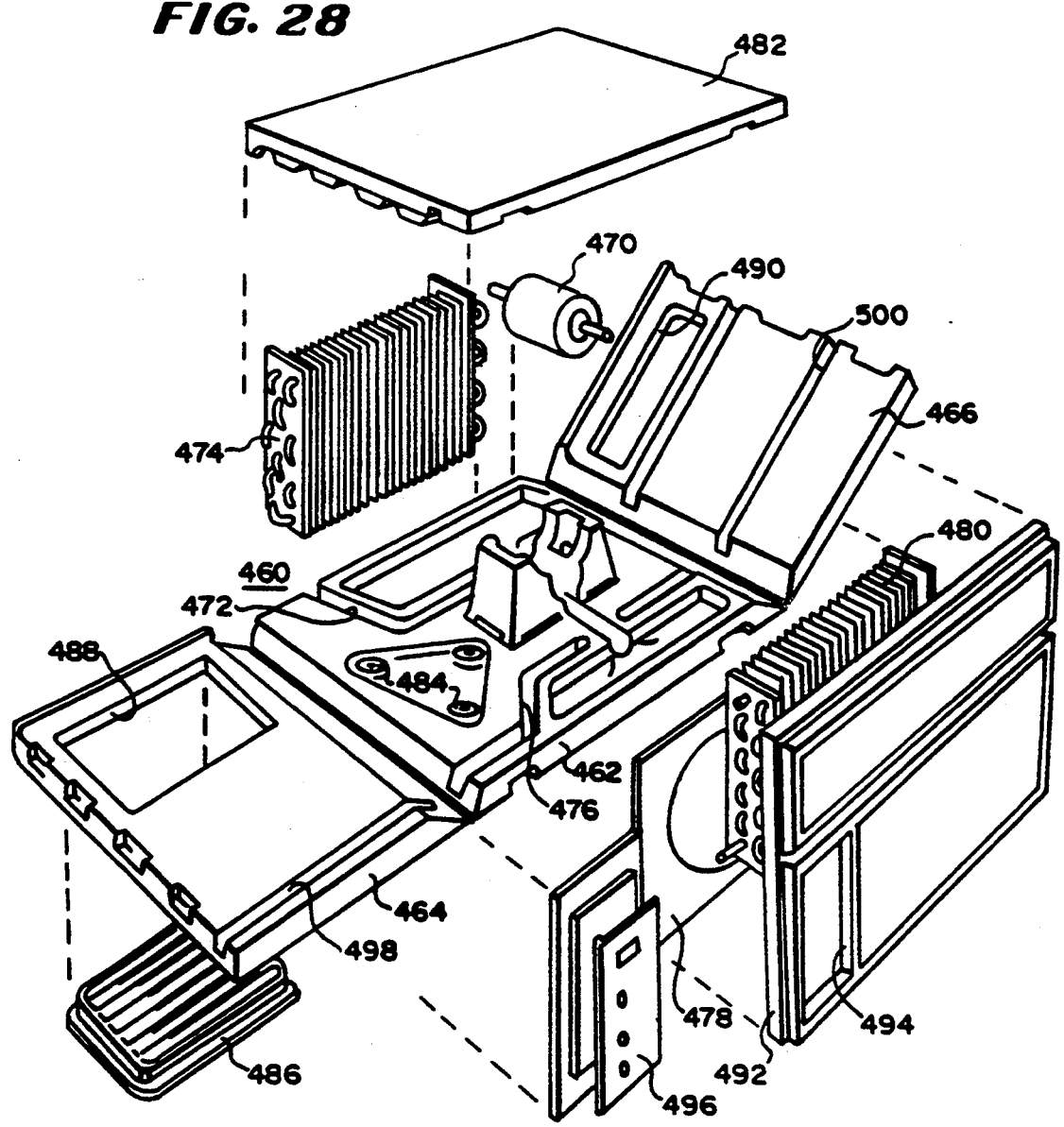
FIG. 28 is an exploded perspective view of a window air conditioner which incorporates interconnected panels formed by the process of the present invention.

Referring now to FIG. 28, a window air conditioner indicated generally at 460 is shown therein in which the base panel 462 and side panels 464 and 466 are formed by the twin sheet thermoforming process to provide the base and side walls of the window air conditioner 460. The panels 462, 464 and 466 may be foamed in place to provide additional strength, or in the alternative, strengthening inserts can be molded into the structure at the time of manufacture to obtain additional strength, as described in detail heretofore. If desired, the meeting edges of the base panel 462 and side walls 464 and 466 may be provided with suitable interlocking means to hold these panels in assembled position, as described in detail heretofore in connection with the humidifier of FIG. 25.

The base 462 is provided with a yoke portion 468 which extends upwardly from the surface thereof and mounts the fan motor 470. The base member 462 is provided with a first slot 472 which is adapted to receive a plastic divider wall (not shown) which mounts the condenser 474 of the window air conditioning unit. Base 462 is also provided with the slot 476 which is adapted to receive a molded plastic front divider wall 478 on which is mounted the evaporator 480. The top panel 482 may be formed by the twin sheet thermoforming process and is arranged to be snapped into place on the upper edges of the side walls 464 and 466 to provide a complete enclosure for the window air conditioner. Base 462 is also provided with the mounting studs 484 so that a suitable compressor (not shown) can be mounted on the base member 462. Injection molded side louvre panels, such as the panel 486, are arranged to be snapped into place in openings 488 and 490 in the side walls 464 and 466, respectively. The molded plastic front grill 492 can be snapped into place on the edges of the side walls 464 and 466 and is provided with an opening 494 through which the control panel portion 496 of the front divider wall 478 extends. It should be noted that the side walls 464 and 466 are provided with slots to receive the front and rear divider walls, such as the slots 498 and 500, in the side walls 464 and 466, respectively, for the front divider wall 478.

Figure 29:
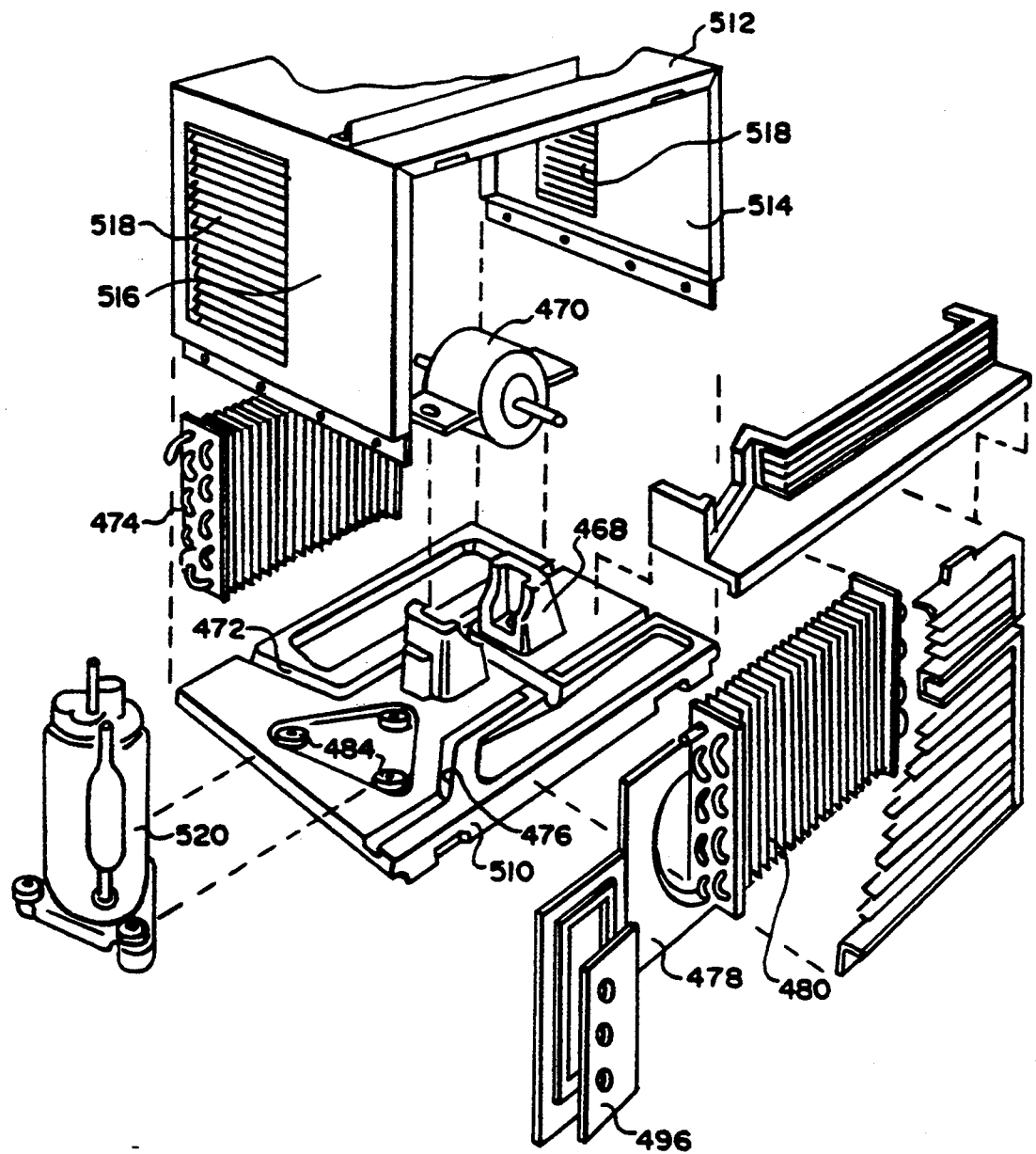
FIG. 29 is an exploded perspective view of an alternative window air conditioner which incorporates a panel formed by the process of the present invention.

Referring to FIG. 29, an alternative window air conditioning arrangement is shown therein wherein only the base member 510 of the window air conditioning unit is formed by the twin sheet thermoforming process, the top wall 512 and the side walls 514 and 516 being formed as a sheet metal cover having the louvers 518 formed therein. In other respects the window air conditioning unit of FIG. 29 is similar to that shown in FIG. 28 and similar reference numerals have been applied to corresponding elements thereof. However, in FIG. 29 the motor compressor 520 is shown, which mounts on the studs 484 of the base 510.

Modular Ice Cube Maker Using Twin Sheet Thermoformed Panels

Figure 30:
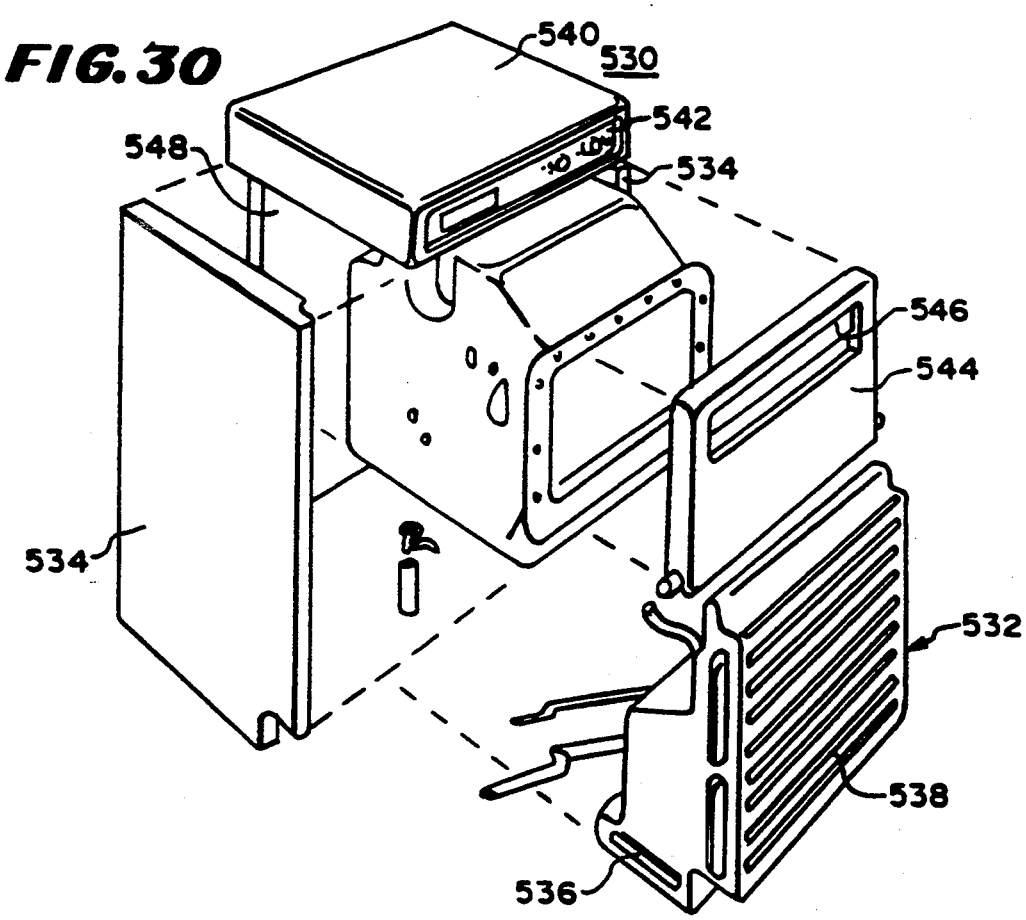
FIG. 30 is an exploded perspective view of an ice cube maker which incorporates panels formed by the process of the present invention.

Referring now to FIG. 30, an ice cube maker indicated generally at 530 is shown therein which employs panels formed by the twin sheet thermoforming process of the present invention. More particularly, the ice cube maker 30 employs a sealed modular refrigeration unit indicated generally at 532 which is generally similar to side wall panel unit 60 of the chest freezer 50 described in detail heretofore. However, in the ice cube maker 530 the modular refrigeration unit 532 functions as the lower portion of the front wall of the unit as well as the base of the ice cube maker 530. The side walls 534 of the ice cube maker 530, which are preferably formed by the twin sheet thermoforming process of the present invention, are arranged to be snapped into corresponding slots 536 in the side walls of the refrigeration unit 532. The sealed refrigeration unit 532 also includes the front grill portion 538 and requires only a water hook-up, a sump and a power connection to provide an operative refrigeration unit. Top panel 540 of the ice cube maker 530, which may also be made by the twin sheet thermoforming process and may include a front panel portion 542 which houses the controls for the refrigeration unit 532, is arranged to be mounted on the upper edges of the side walls 534. The front door panel 544 may also be made by the twin sheet thermoforming process and is pivotally mounted on the upper edge of the sealed unit 532 and is provided with a recessed handle portion 546. A rear wall panel 548 may also be formed by the twin sheet thermoforming process and is arranged to be mounted on the sealed unit 532 and the top 540 before the side panels 534 are snapped into place to provide the complete insulated enclosure for the ice cube maker 530.

Compact Countertop Refrigerator Using Twin Sheet Thermoformed Panels

Figure 31:
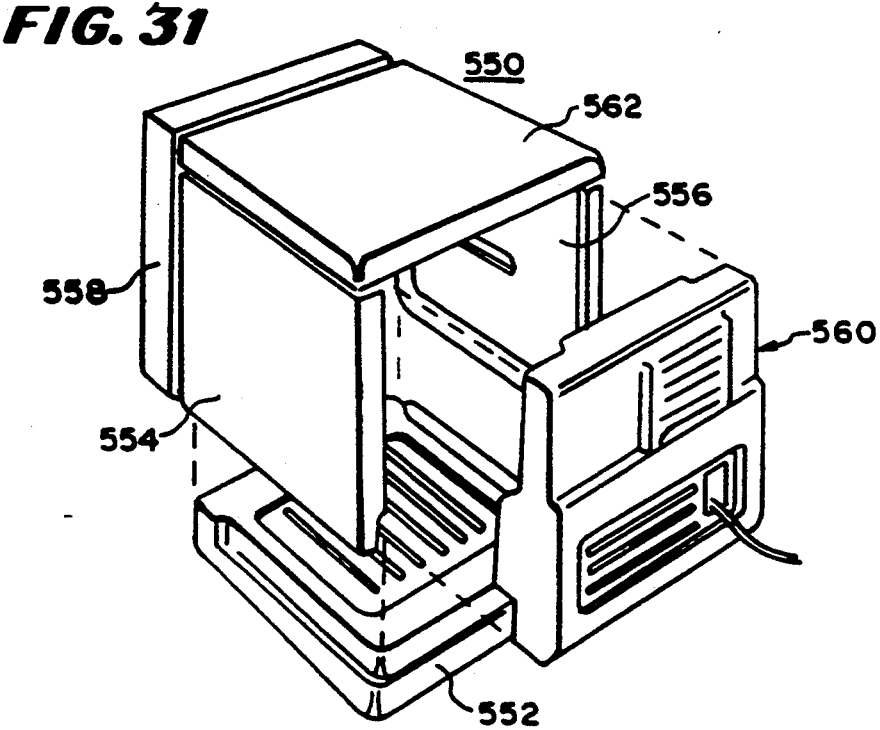
FIG. 31 is an exploded perspective view of a countertop refrigerator which incorporates panels formed by the process of the present invention.

Referring to FIG. 31, there is shown a compact countertop refrigerator indicated generally at 550 which employs the base panel 552, side panels 554 and 556 and hinged front door panel 558, all of which are formed by the twin sheet thermoforming process described in detail heretofore. A sealed mechanical refrigeration unit 560 forms the back panel of the countertop refrigerator 550. Panels 554 and 556 and the sealed unit 560 are provided with suitable interlocking surfaces which permit assembly of these panels onto the base panel 552 in the manner described in detail heretofore in connection with the chest freezer 50. Also, the sealed mechanical refrigeration unit 560, which forms the back panel of the countertop refrigerator 550 may be substantially identical to the sealed mechanical refrigeration unit which forms the side walls 60 of the chest freezer 50. A top wall 562, which may also be formed by the above-described twin sheet thermoforming process, is also provided with suitable interlocking surfaces which engage and seal the top 562 to the side walls 554 and 556 and the upper edge of the back wall 560 which houses a sealed mechanical refrigeration unit.

In FIG. 37, there is shown an alternative compact countertop refrigerator arrangement wherein the base panel 551, the side panels 553 and 555 and the top panel 557 are all formed as a one-piece four panel folding shell arrangement which is formed by the twin sheet thermoforming process of the present invention in the manner described in detail heretofore in connection with the humidifier of FIG. 25. A sealed mechanical refrigeration unit 559 forms the back panel of the compact refrigerator of FIG. 37 and is similar in construction to the side panel unit 60 of the chest freezer 50 described in detail heretofore. The front door 561 of the compact countertop refrigerator of FIG. 37 is also formed by the twin sheet thermoforming process in which a groove 567 is formed in the periphery of the door 561 to receive a sealing gasket which seals the door against the adjacent edges of the panels 551–557. Preferably the door 561 is mounted on side panel 555 by providing the hidden hinges 563 which are mounted in the panel 555 at the time of manufacture and mesh with corresponding hinge portions 565 which are formed in the door 561 at the time of manufacture. If desired, the side panels 553 and 555 may be provided with grooves 571 in the edges thereof which mate with the corresponding edges of the base panel 551 and receive a gasket to provide additional sealing between these units. Also, the top panel 557 may be provided with the grooves 569 which are adapted to receive gaskets to provide sealing between the top panel 557 and the side panels 553 and 555. Also, the meeting edges of the panels 551, 553, 555 and 557 may be provided with suitable interlocking means, as described in detail heretofore in connection with the humidifier of FIG. 25.

Vertical Freezer Employing Thermoformed Panels

Figure 32:
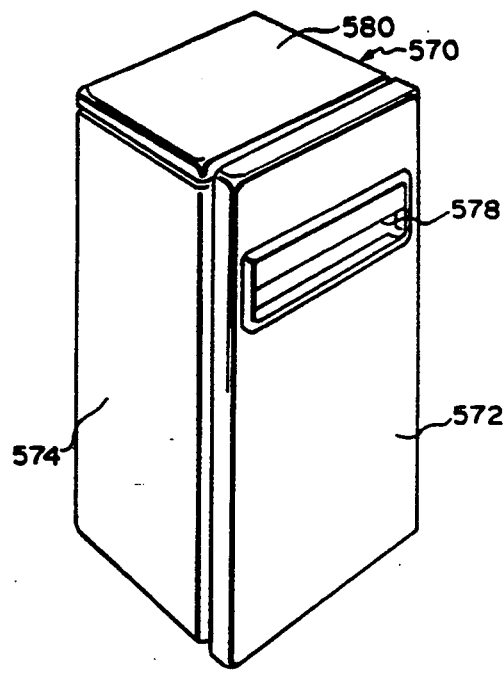
FIG. 32 is a perspective view of a vertical freezer which incorporates panels formed by the process of the present invention.
Figure 33:
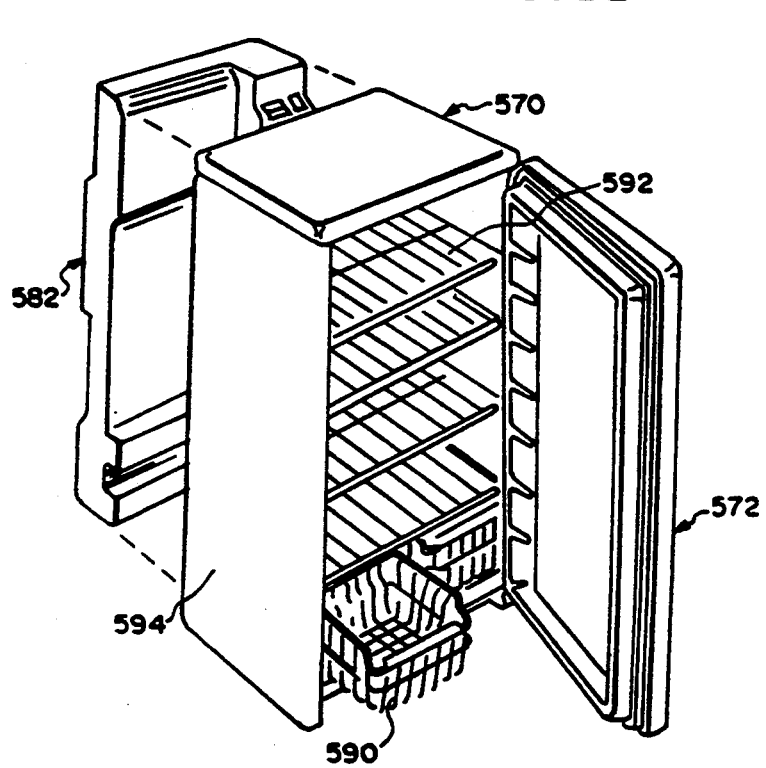
FIG. 33 is an exploded perspective view of the freezer of FIG. 32 shown with the door open and with the back mechanical refrigeration unit panel removed.
Figure 34:
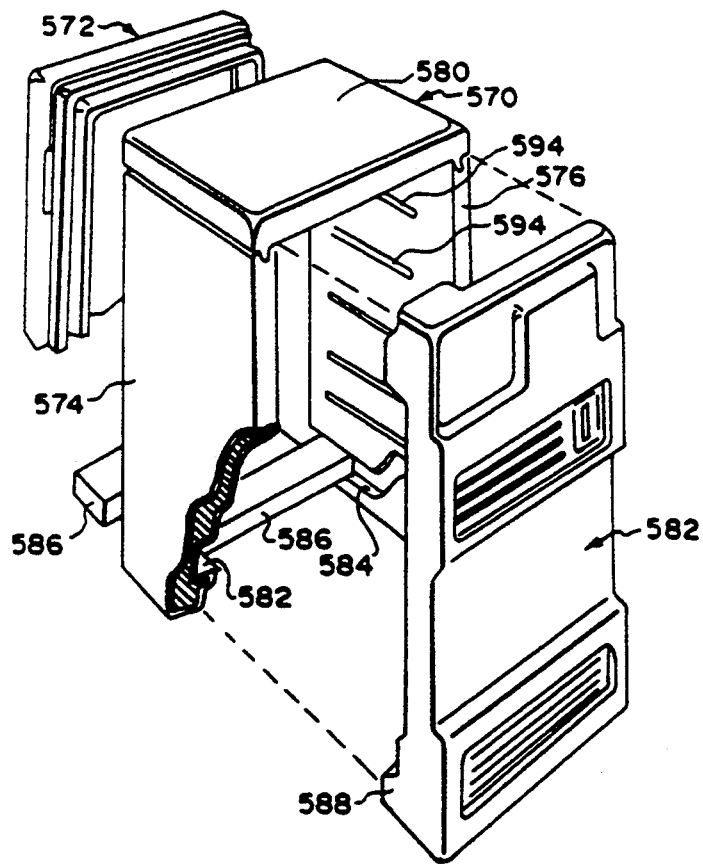
FIG. 34 is a rear exploded perspective view of the freezer of FIG. 32 shown with the back panel and door removed and a portion of one side wall broken away.

FIGS. 32, 33 and 34 disclose an alternative embodiment in which the twin sheet thermoforming process of the present invention is employed in a vertical freezer indicated generally at 570. More particularly, the front door panel 572 of the vertical freezer 570, which may be mounted on one of the vertical side walls 574 or 576, is provided with a horizontal recessed handle portion 578 which is formed in the door 572 during the original manufacturing operation thereof. The front door 572, the side panels 574 and 576 and the top panel 580 of the vertical freezer 570 are all formed by the twin sheet thermoforming process described in detail heretofore. The back panel 582 of the vertical freezer 570 is formed by a completely sealed mechanical refrigeration unit which is similar to the side wall panel 60 of the chest freezer 50 described heretofore. The side walls 574 and 576 and the top 580 are provided with interlocking surfaces which permit the assembly of the top 580 onto the upper edges of the side walls 574. Similarly, the back wall unit 582 is provided with suitable interlocking surfaces which provide a sealed connection to the rear edges of the side walls 574 and 576. To provide an insulated bottom wall for the vertical freezer 570, the side walls 574 and 576 are provided with the slots 582 and 584 which are adapted to receive bars 586 of insulating material, the bars 586 extending over the bottom portion 588 of the sealed mechanical unit 582 which portion houses the compressor of the refrigeration unit. The pull out wire baskets 590 may be slidably mounted on the bars 586 which form the base member of the unit 570 and wire shelves 592, which may be removed, are supported on the horizontal ridges 594 formed in the inner walls of the side walls 574 and 576, as best illustrated in FIG. 34.

Modular Refrigerator With Freezer Compartment

Figure 35:
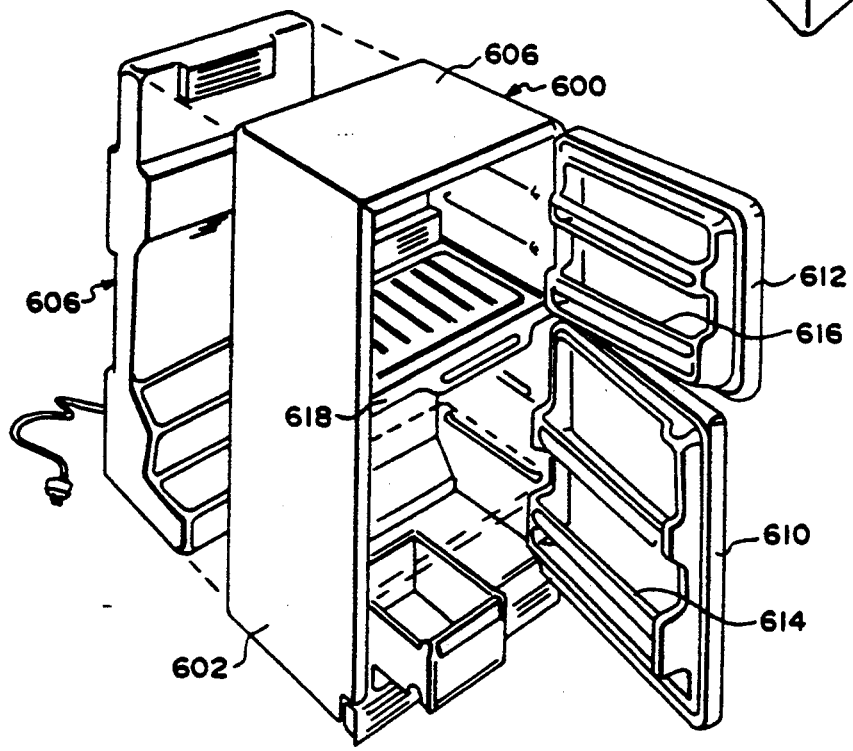
FIG. 35 is an exploded perspective view of a top mount refrigerator/freezer which incorporates panels formed by the process of the present invention.

Referring to FIGS. 35 and 36, there is therein illustrated a modular refrigerator with freezer compartment, indicated generally at 600, which employs panels formed by the twin sheet thermoforming process of the present invention. More particularly, the side walls 602 and 604 and top 606 are preferably formed by a one-piece three panel molding similar to that described in detail heretofore in connection with FIG. 24. The rear panel 607 of the refrigerator 600 is a self-contained sealed refrigeration unit similar to the panel 60 of the chest freezer 50, described in detail heretofore. The base panel 608 is arranged to be mounted in grooves in the side walls 602 and 604, as illustrated in FIG. 36. A lower front door 610 for the refrigerator compartment is mounted on the side wall 604 and an upper door 612 for the freezer compartment is also mounted on this side wall. Doors 610 and 612 are also formed by the twin sheet thermoforming process of the present invention. The trays 614 and 616, respectively, are provided on the inner sides of the door 610 and 612. A divider panel 618, which is also formed by the twin sheet thermoforming process, is positioned between the side walls 602 and 604 to separate the upper freezer compartment from the lower refrigerator compartment.

Trash Compactor Using Twin Sheet Thermoformed Panels

Figure 38:
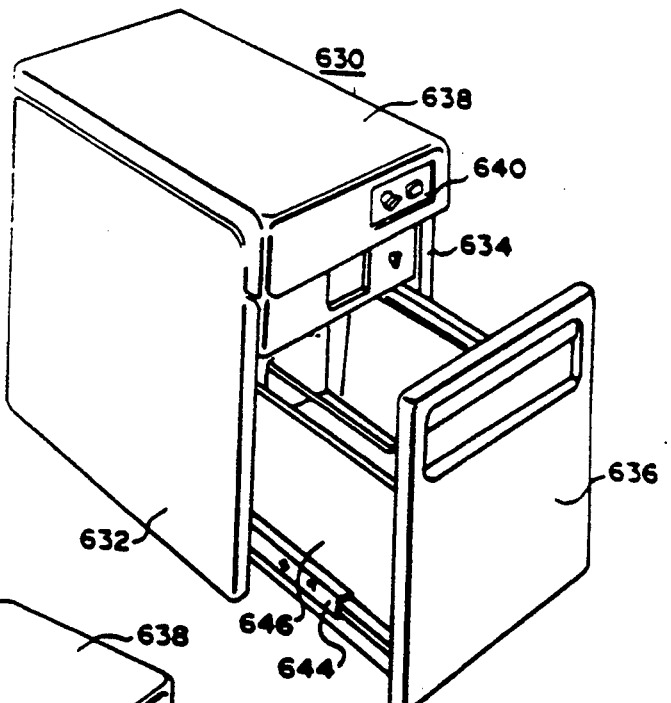
FIG. 38 is a left side perspective view of a trash compactor which incorporates panels formed by the process of the present invention and shown with the slide out door thereof open.
Figure 39:
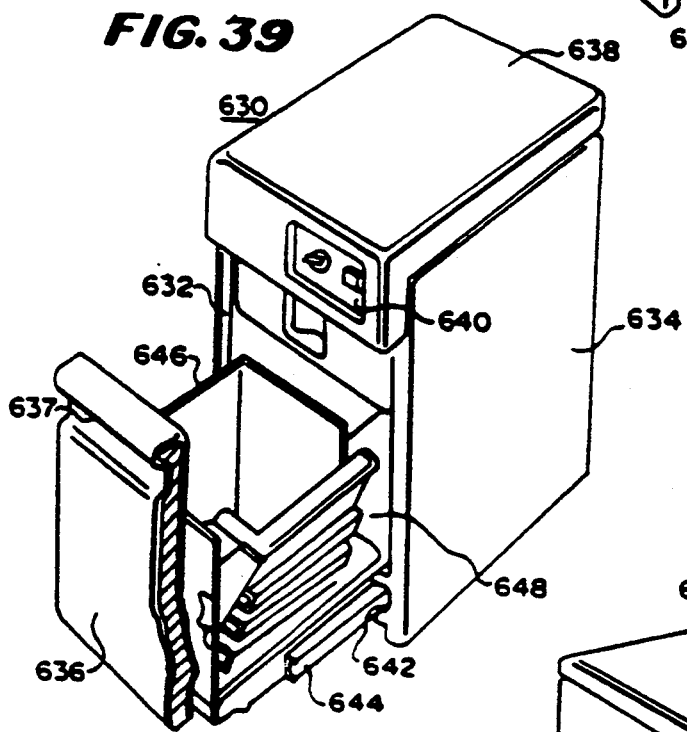
FIG. 39 is a right side perspective view of the trash compactor of FIG. 38 shown with a portion of the door broken away.

In FIGS. 38 and 39 there is shown a trash compactor, indicated generally at 630, which employs side panels 632 and 634 which are formed by the twin sheet thermoforming process and a slide out front door 636 which is also formed by this process. The top unit 638 of the trash compactor 630 has a modular unit which houses the complete mechanical system of the trash compactor including the power screw and ram, as will be readily understood by those skilled in the art. Preferably, the top unit 638 also has a built in control panel 640 for the entire mechanical system. The side panels 632 and 634 are formed with horizontally extending grooves 642 in the inner bottom edges thereof, as best illustrated in FIG. 39, the grooves 642 being adapted to receive the glides 644 which support the pull out front door 636 and container assembly 646 which holds the carrier bag of the trash compactor 630. The bottom panel or base 648 of the compactor 630, which provides for the location of the side panels 632 and 634 preferably also is formed by the twin sheet thermoforming process of the present invention. The top and side panels of the compactor 630 can be molded with a wood grain and foamed for rigidity if required. If desired, the slide out front door 636 may have a handle portion 637 formed therein at the time the panel is manufactured.

Microwave Oven Using Twin Sheet Thermoformed Panels

Figure 40:
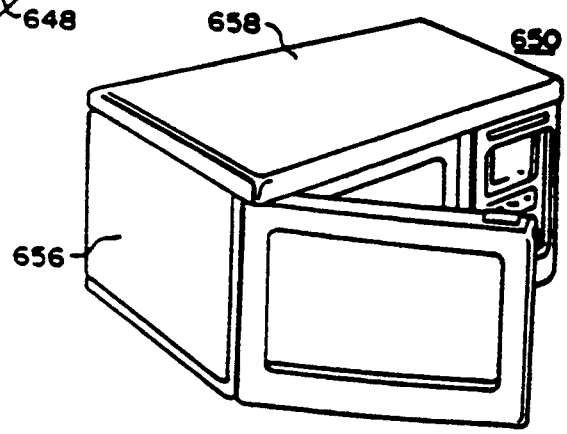
FIG. 40 is a perspective view of a microwave oven which incorporates panels formed by the process of the present invention.
Figure 41:
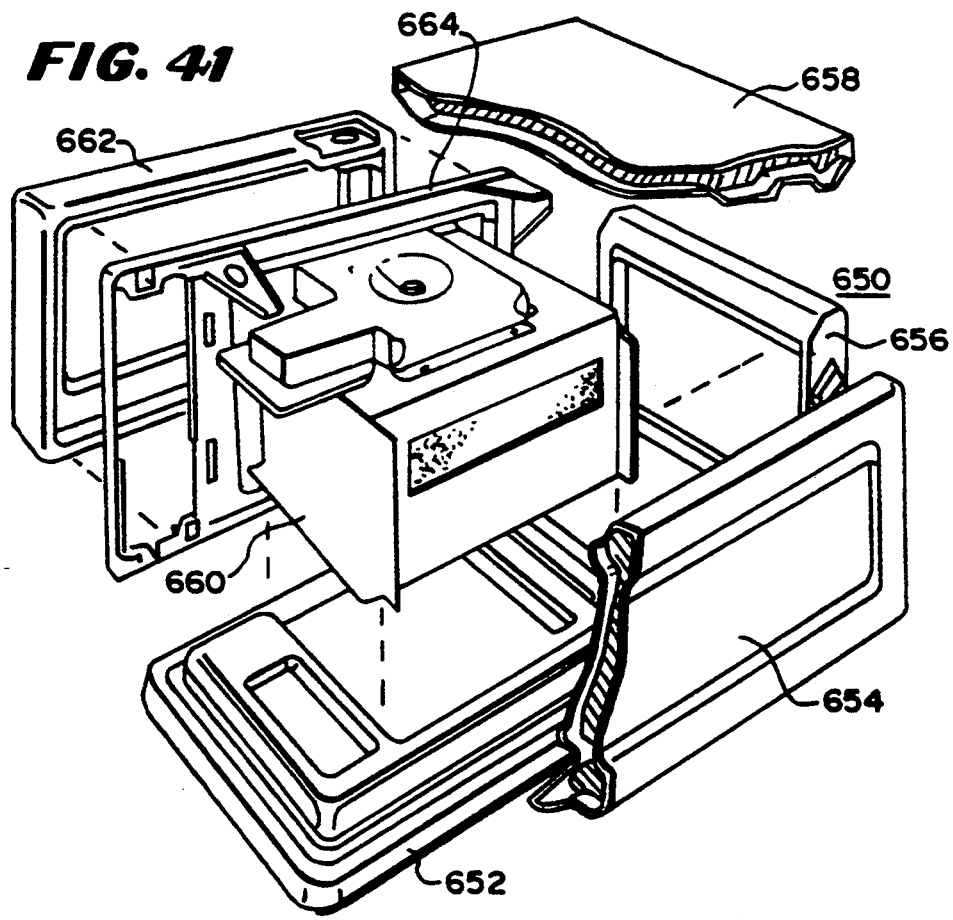
FIG. 41 is an exploded rear perspective view of the microwave oven of FIG. 40 and shown without one side wall and with portions of the rear and top panels broken away.

In FIGS. 40 and 41, there is shown a microwave oven which utilizes panels which are formed by the twin sheet thermoforming process of the present invention. More particularly, the microwave oven indicated generally at 650 includes an exterior cabinet which comprises a base panel 652 on which is mounted a rear panel 654 and side panels 656. The base panel 652, rear panel 654 and side panel 656, are formed by the twin sheet thermoforming process of the present invention and are preferably provided with interlocking tongues and grooves and interlocking shoulders, in the manner described in detail heretofore in connection with the base and side walls of the chest freezer 50, so as to provide a sealed compartment having a twin sheet thermoformed top panel 658 secured to the upper edges of the panels 654 and 656. The microwave cabinet 660 fits within the compartment formed by the panels 654 and 656 and a recessed door 662 is pivotally mounted on one side of the frame portion 664 of the cabinet 660. If desired, the side panels 656 and top 658 may comprise a one-piece folded panel arrangement in which hinge portions are provided between the top 658 and the sides 656, as described in detail heretofore in connection with the cabinet 352 of the dehumidifier shown in FIG. 24.

Portable Dishwasher Using Twin Sheet Thermoformed Panels

Figure 42:
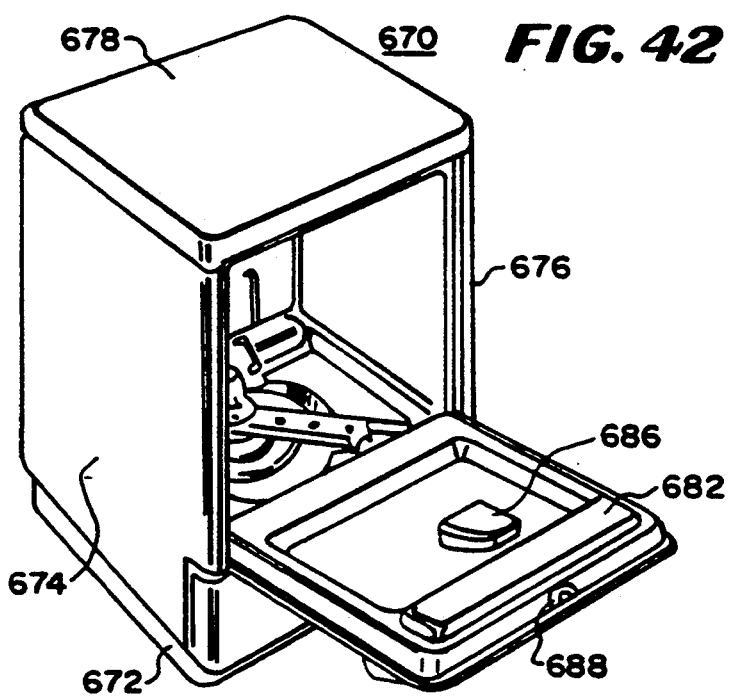
FIG. 42 is a perspective view of a dishwasher which incorporates panels formed by the process of the present invention and shown with the front door thereof open.
Figure 43:
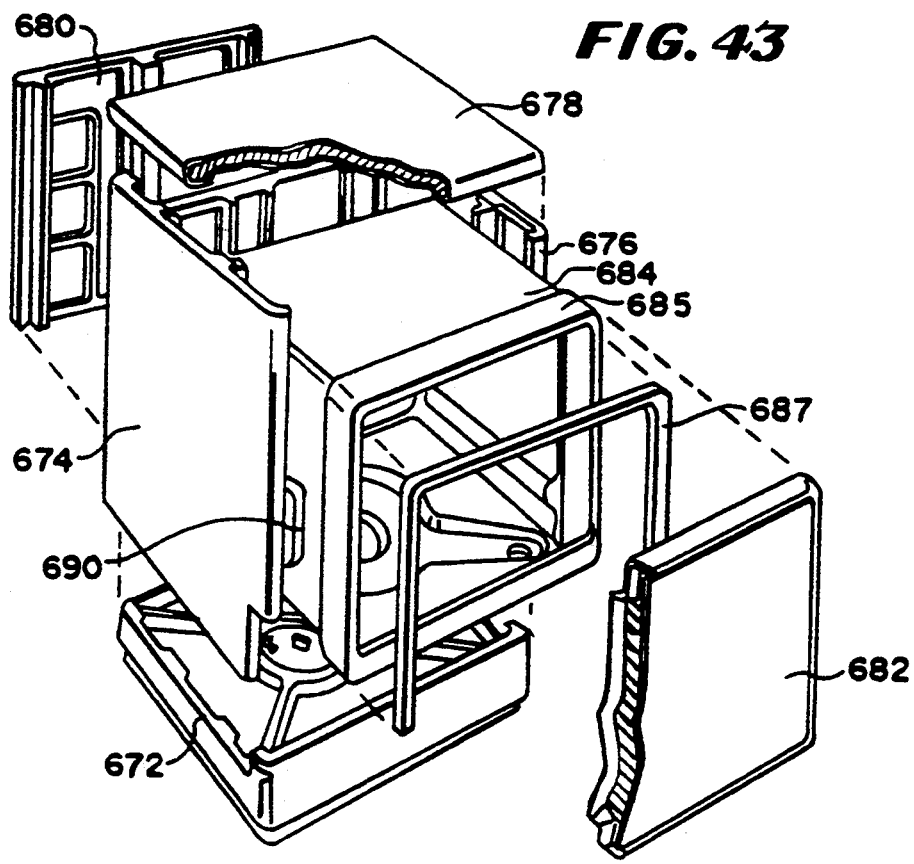
FIG. 43 is an exploded rear perspective view of the dishwasher of FIG. 42 shown with portions of the door and top panel thereof broken away.

FIGS. 42 and 43 disclose a portable dishwasher, indicated generally at 670, which includes a base panel 672 which supports the motor parts and pump of the portable dishwasher, the side panels 674 and 676 of the dishwasher 670 being arranged to be snapped into place on the base 672. A top panel 678 is also arranged to interlock with the side panels 674 and 676. A rear panel 680 is assembled on the rear edges of the side walls 674 and 676. A fold down front door 682 is mounted on the front of the tub assembly 684 that holds the wash arm and heating element of the dishwasher. The tub assembly includes a collar portion 685 which is adapted to receive a gasket 687. The front door 682 may include the detergent dispenser 686 and latch 688. The latch 688 and housing for the detergent dispenser 686 may be formed in the door 682 at the time of manufacture thereof. The tub assembly 684 is supported on the side panels 674 and 676 by means of the tongues 690 which engage in corresponding grooves formed in the inner walls of the side panels 674 and 676. The base panel 672, the side panels 674 and 676, the top 678, the rear panel 680 and the front door 682 may all be formed by the twin sheet thermoforming process of the present invention. If desired, the front door 682 and the top 678 may have insulation between the inner and outer walls thereof, as illustrated in FIG. 43, to reduce noise and heat loss.

Gas Dryer Using Twin Sheet Thermoformed Panels

Figure 44:
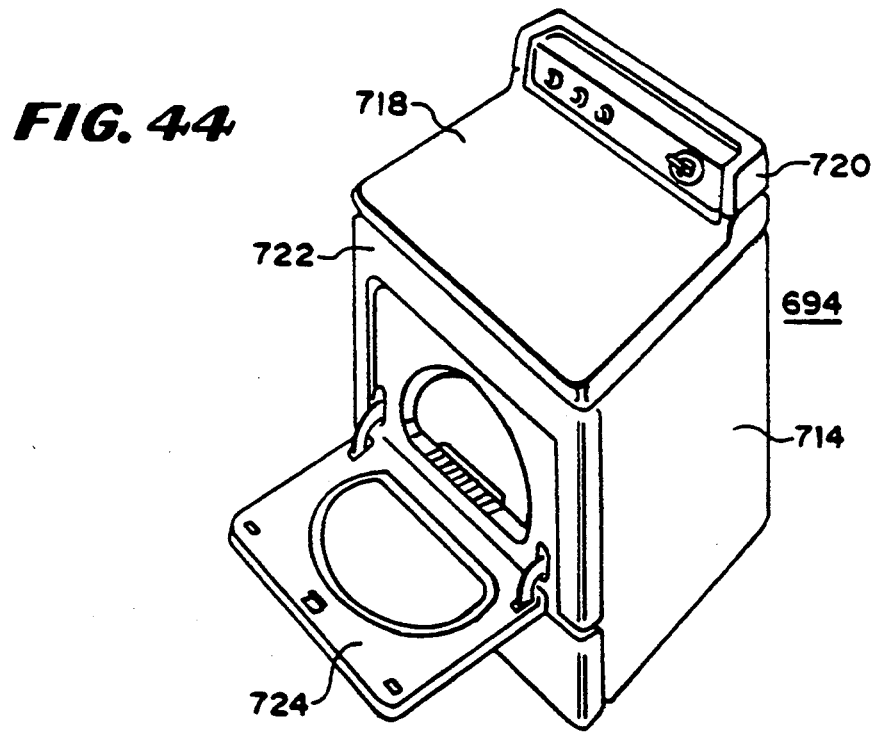
FIG. 44 is a right hand perspective view of a gas dryer which incorporates panels formed by the process of the present invention and shown with the front door thereof open.
Figure 45:
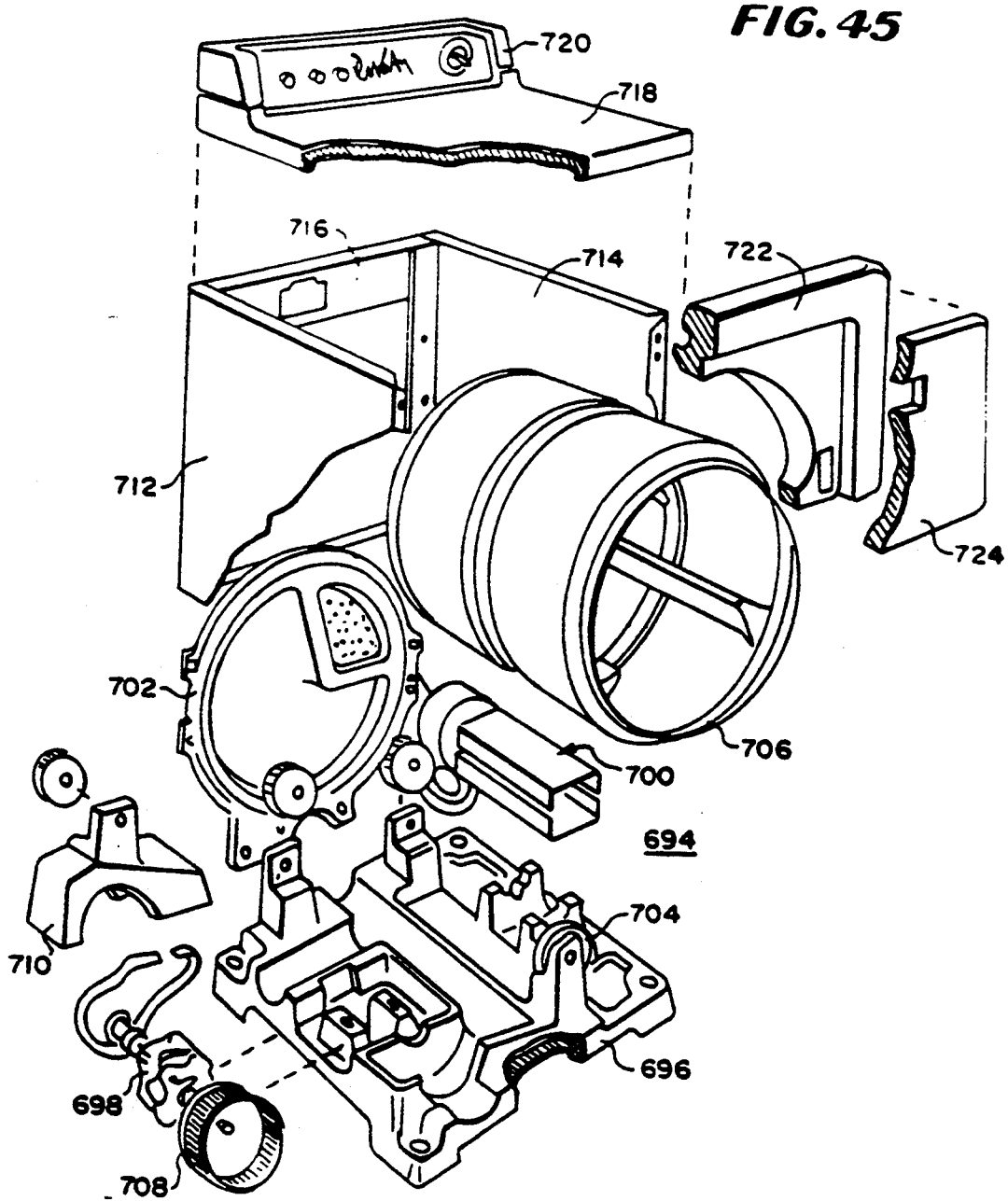
FIG. 45 is an exploded left hand perspective view of the gas dryer of FIG. 44 shown with portions of the top, door and front wall thereof broken away.

In FIGS. 44 and 45 there is shown a gas dryer, indicated generally at 694 in which panels formed by the twin sheet thermoforming process of the present invention are employed. More particularly, the base member 696 (FIG. 45) of the gas dryer 694 is formed by the twin sheet thermoforming process of the present invention and is configured to hold the motor assembly 698 and burner assembly 700 which includes the blower housing and heater box, plus exhaust. The plastic molded bulkhead 702 is designed to be locked into the base 696; and the base 696 also includes supports for four rollers, one of which is shown at 704 in FIG. 45, the rollers 704 supporting the drum assembly 706 in a conventional manner. The blower 708 which is driven by the motor 698 is provided with a plastic cover 710 as indicated in FIG. 45. The side walls 712 and 714 and rear wall 716 are preferably sheet metal panels which can be formed in a single operation and locked into the base panel 696. A top panel 718, which is preferably formed by the twin sheet thermoforming process, provides strength for the gas dryer and locks the sheet metal side panels 712 and 714 in place. Panel 718 includes a separate molded plastic portion 720 that forms the control panel of the gas dryer 694. The front panel 722 of the gas dryer 694 is also formed using the twin sheet thermoforming process and mounts a fold down front door 724 which may be of molded plastic material. The base panel 696, the top panel 718 and the front panel 722 may be foamed in place for rigidity and energy conservation, as shown in FIG. 45 of the drawings. Preferably, the door 724 may be molded using a molded-in-place gasket and handle (not shown) to simplify construction of the gas dryer 694.

Washer/Dryer Combination Using Twin Sheet Thermoformed Panels

Figure 46:
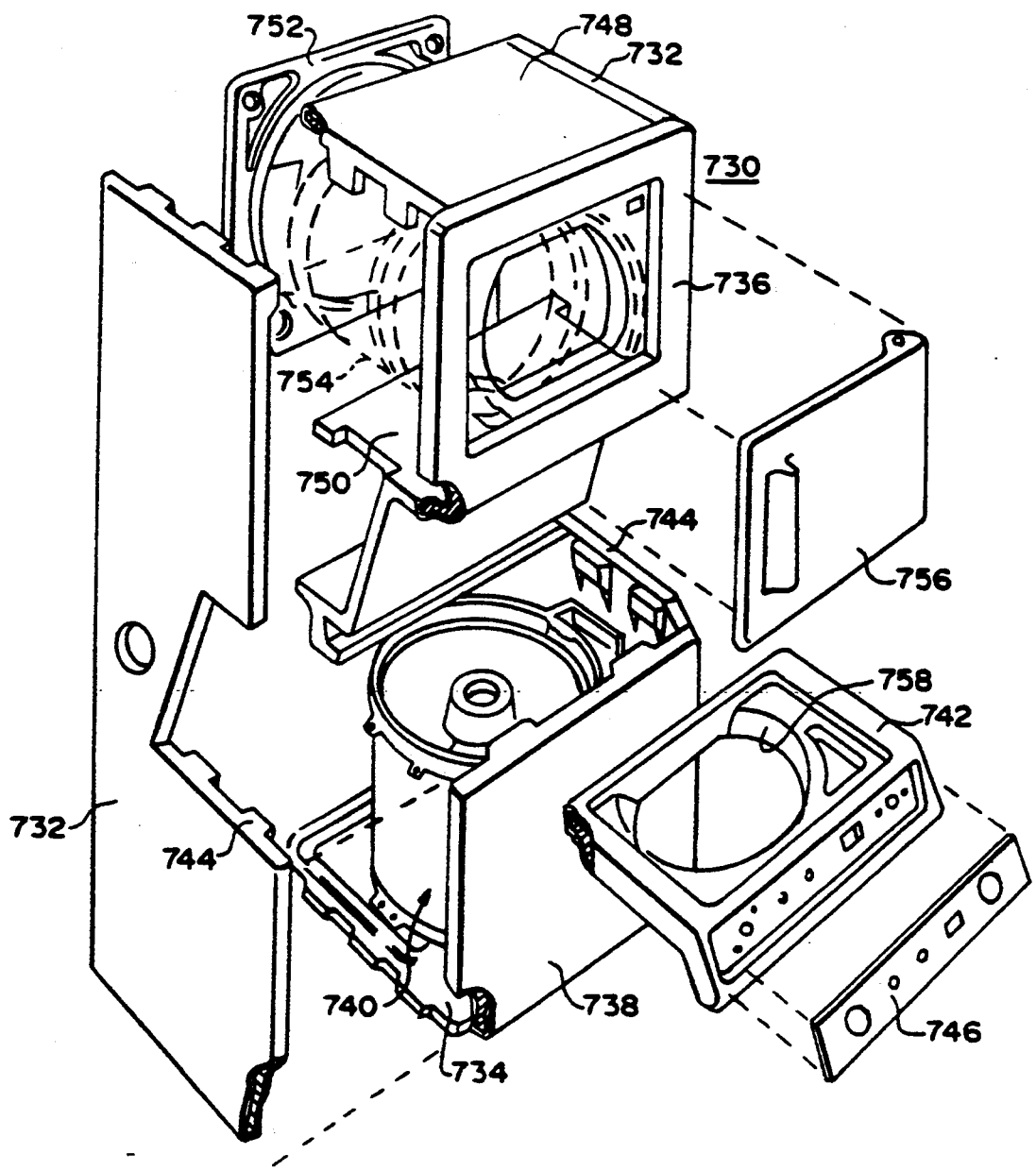
FIG. 46 is a left hand exploded perspective view of a combination washer/dryer which incorporates panels formed by the process of the present invention and shown with portions of the side, front and top walls broken away.

In FIG. 46 there is shown a washer/dryer combination unit, indicated generally at 730, which employs twin sheet thermoformed side panels 732, and a base panel 734 which is also formed by the twin sheet thermoforming process. Front panel 736 for the upper dryer portion of the unit 730 and a lower front panel 738 for the washer portion thereof are also formed by this process. The molded plastic tub and basket assembly 740, with motor and agitator assembly therefor are mounted on the base member 734. A molded top panel 742 for the washer portion of the unit 730 is mounted on the ledges 744 formed in the side panels 732 and the top edge of the washer front panel 738, the washer panel 742 incorporating controls for the washer portion of the unit 730 and mounting the escutcheon plate 746. The top panel 748 of the dryer portion of the unit 730 is also of twin sheet thermoformed construction and is arranged to interlock with the upper edges of the side panels 732. It will thus be seen that the entire exterior cabinet of the unit 730 is constructed using a combination of panels which have been formed in accordance with the twin sheet thermoforming process of the present invention. The dryer front panel 736 is provided with a divider panel portion 750 which provides a support for the rear bulkhead 752 and forward bulkhead (not shown) of the dryer assembly and includes support for the motor mount and roller supports for the drum 754. A plastic dryer door 756 is arranged to be hingedly mounted on the dryer front panel 736 and a suitable plastic closure is provided for the opening 758 in the washer top panel 742.

Automatic Washer Using Twin Sheet Thermoformed Panels

Figure 48:
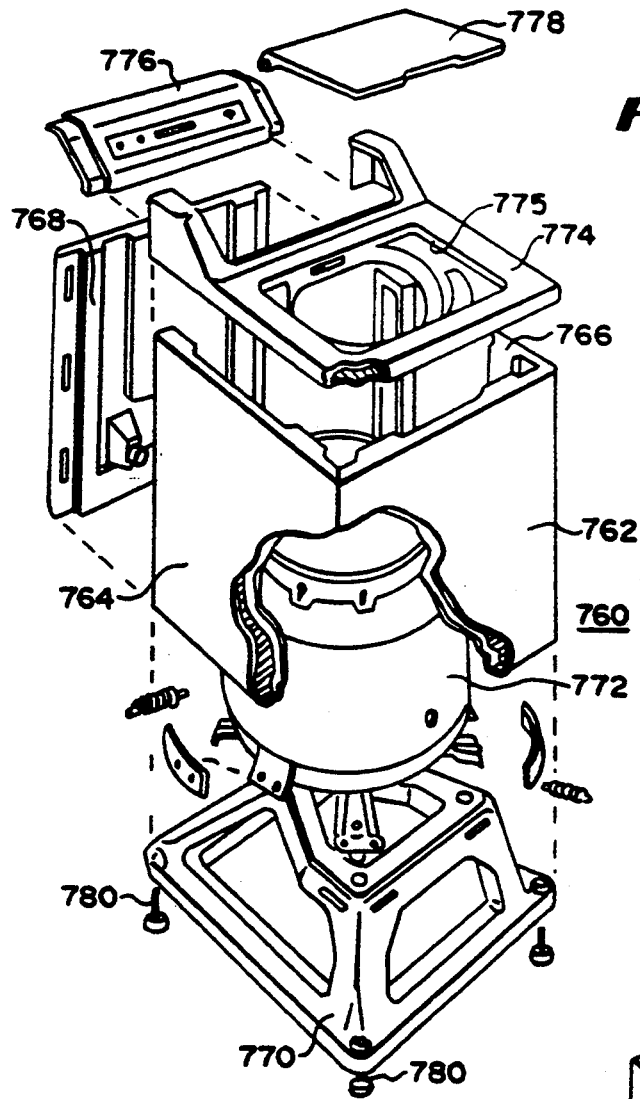
FIG. 48 is an exploded perspective view of the automatic washer of FIG. 47 and shown with portions of the top and side walls thereof broken away.
Figure 47:
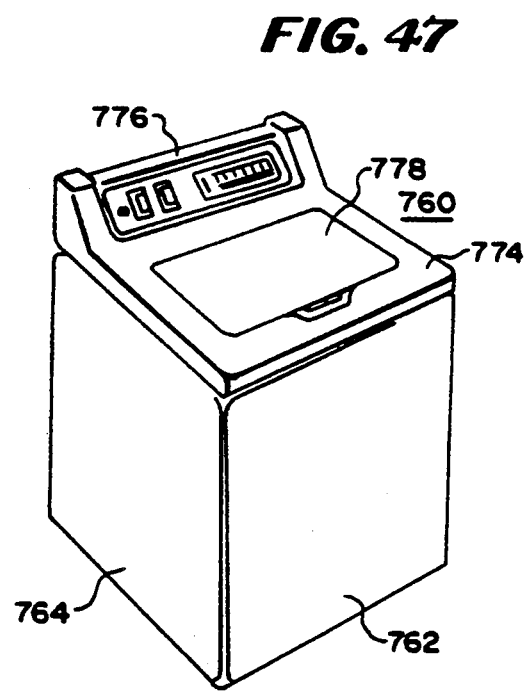
FIG. 47 is a perspective view of an automatic washer which incorporates panels formed by the process of the present invention.

In FIGS. 47 and 48 there is shown an automatic washer indicated generally at 760 which employs twin sheet thermoformed panels in accordance with the present invention. More particularly, the front panel 762 and the side panels 764 and 766 are formed in one piece in a twin sheet thermoforming process similar to that described in detail heretofore in connection with the dehumidifier cabinet 352 (FIG. 24). The rear edges of the side panels 764 are provided with snap tabs to locate and support the rear panel 768 which is also formed by the twin sheet thermoforming process. The base 770 of the automatic washer 760 is formed by the twin sheet thermoforming process and supports the motor and pump assembly of the washer and the outer plastic tub 772 which holds the basket and agitator parts. The side panels 762–768 are mounted on the base member 770 and a cabinet top panel 774, which is also made by the twin sheet thermoforming process, is mounted on the upper edges of the panels 762, 764 and 766. Controls for the washer 760 are provided as a removable unit 776 which is mounted in the rear portion of the top panel 774. A lid 778 for the dryer 760 is mounted on the top panel 774 to close the clothes opening 775 therein. Front and rear adjustable feet 780 are mounted in the base member 770 by providing suitable inserts at the time the base panel 770 is formed, as described in detail heretofore in connection with the chest freezer 50. The rear panel 768 houses the hose and electrical connections for the washer 760. The hollow wall construction of the panels 762, 764, 766, 768 and 774 allows for the insertion of insulating material for energy and sound reduction, as illustrated in FIG. 48 of the drawings.

Obviously, many modifications and variations of the present invention are possible in light of the above teachings. Accordingly, it is to be understood that, within the scope of the appended claims, the invention may be practiced otherwise than as specifically described hereinabove.

What is claimed and desired to be secured by Letters Patent is:

1. A refrigerator/freezer having a refrigerator compartment and a freezer compartment, said refrigerator/freezer including a plurality of panels, each of said panels comprising spaced apart inner and outer die-formed walls of plastic material which are sealed together at the edges thereof with adjacent edges of at least two of said panels being sealed to each other so as to be interconnected to each other by an integral hinge portion formed along said sealed adjacent edges, and insulating material at least partially filling the space between said inner and outer walls of each of said panels, said plurality of panels form the top panel, opposed side panels, bottom panel and a divider panel of said refrigerator/freezer, said divider panel being positioned between said side walls to separate said refrigerator compartment and said freezer compartment.

2. A refrigerator/freezer according to claim 1 further including a door for each of said refrigerator and freezer compartments, each of said doors comprising spaced apart inner and outer die-formed walls of plastic material which are sealed together at the edges thereof, and insulating material filling the space between said inner and outer walls.

* * * * *